United States Patent

Anzai

[19]

[11] Patent Number: 6,009,242
[45] Date of Patent: *Dec. 28, 1999

[54] PRINT CONTROLLER, PRINTER, DATA TRANSFER METHOD, AND PRINTING CONDITION SETTING METHOD

[75] Inventor: Katsuhiko Anzai, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/495,229

[22] Filed: Jun. 27, 1995

[30] Foreign Application Priority Data

Jun. 30, 1994 [JP] Japan ..................................... 6-150063
Jul. 14, 1994 [JP] Japan ..................................... 6-161841
Jun. 8, 1995 [JP] Japan ..................................... 7-141944

[51] Int. Cl.$^6$ .................................................. G06F 15/00
[52] U.S. Cl. ............................................ 395/114; 395/112
[58] Field of Search ..................................... 395/114, 115, 395/116, 112; 341/51; 358/261.1, 261.3, 426, 427, 261.4, 262.1, 432, 433, 431, 448, 444, 462, 464, 467, 468

[56] References Cited

U.S. PATENT DOCUMENTS 4,674,895  6/1987  Tanaka et al. ........................... 400/121
4,937,681  6/1990  Fujinawa et al. ....................... 358/426
5,177,480  1/1993  Clark ......................................... 341/51
5,337,258  8/1994  Dennis ................................. 364/551.01
5,479,587  12/1995 Campbell et al. ....................... 395/116
5,493,421  2/1996  Vetama et al. .......................... 358/468

FOREIGN PATENT DOCUMENTS 0510923  10/1992  European Pat. Off. .

Primary Examiner—Dov Popovici
Attorney, Agent, or Firm—Fitzpatrick, Cella, Harper & Scinto

[57] ABSTRACT

An apparatus for outputting image data to a printer that includes a generator, a determining device, a compression device, a storage controller and a transfer device. The generator generates the image data and the determining device determines whether or not a band or a page of the image data generated by the generator is to be compressed, on the basis of an amount of the generated image data to be transferred to the printer. The compression device compresses the image data generated by the generator into compressed data by a band unit or a page unit, in accordance with a determination from the determining device. The storage controller, if the determining device determines that the band or page of the generated image data is to be compressed, controls a memory to store the band or page of the generated image data compressed by the compression device, and, if the determining device determines that the band or page of the generated image data is not to be compressed, controls the memory to store the band or page of the generated image data without compression. The transfer device transfers the stored data from the memory to the printer.

30 Claims, 22 Drawing Sheets

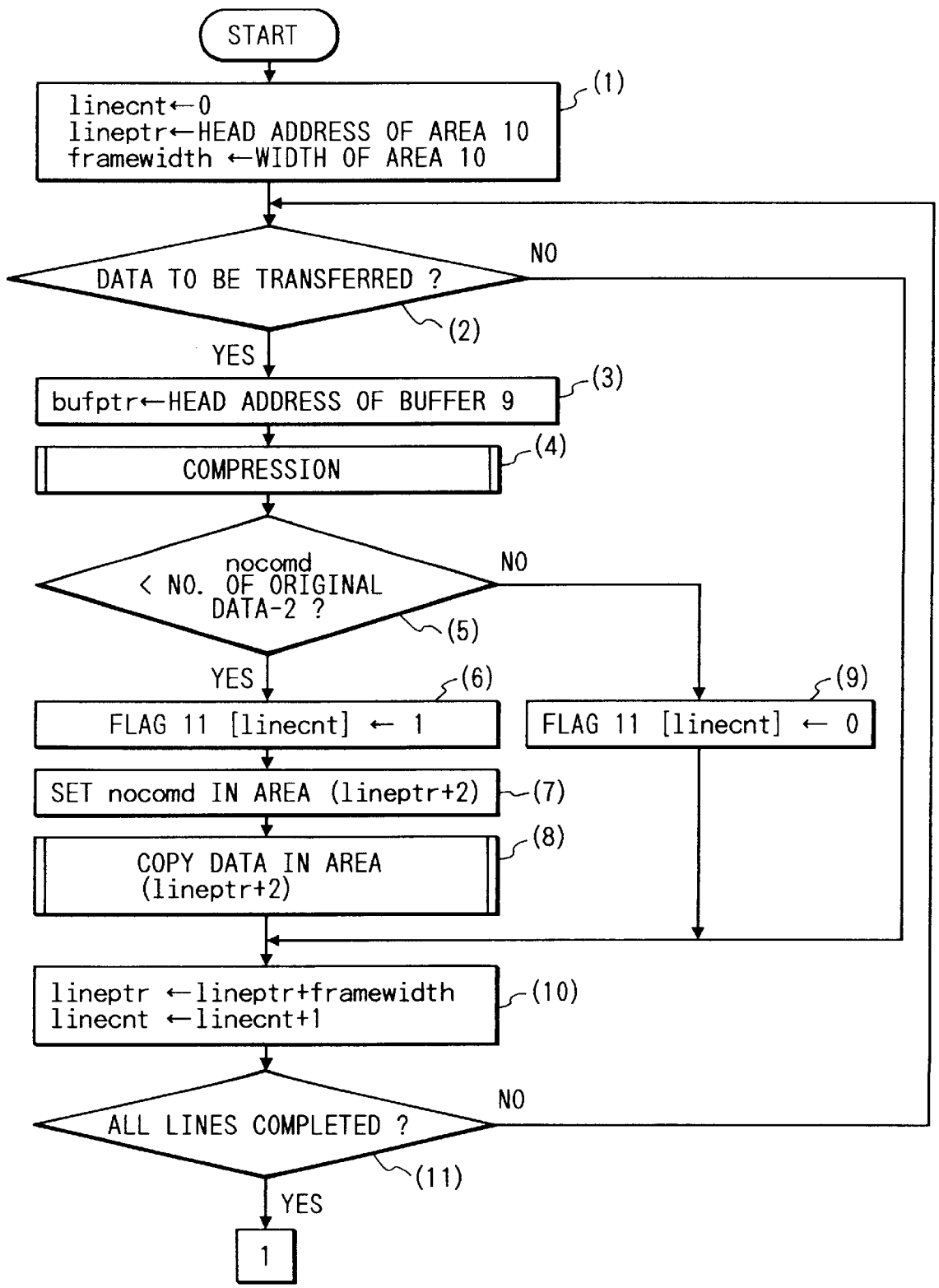

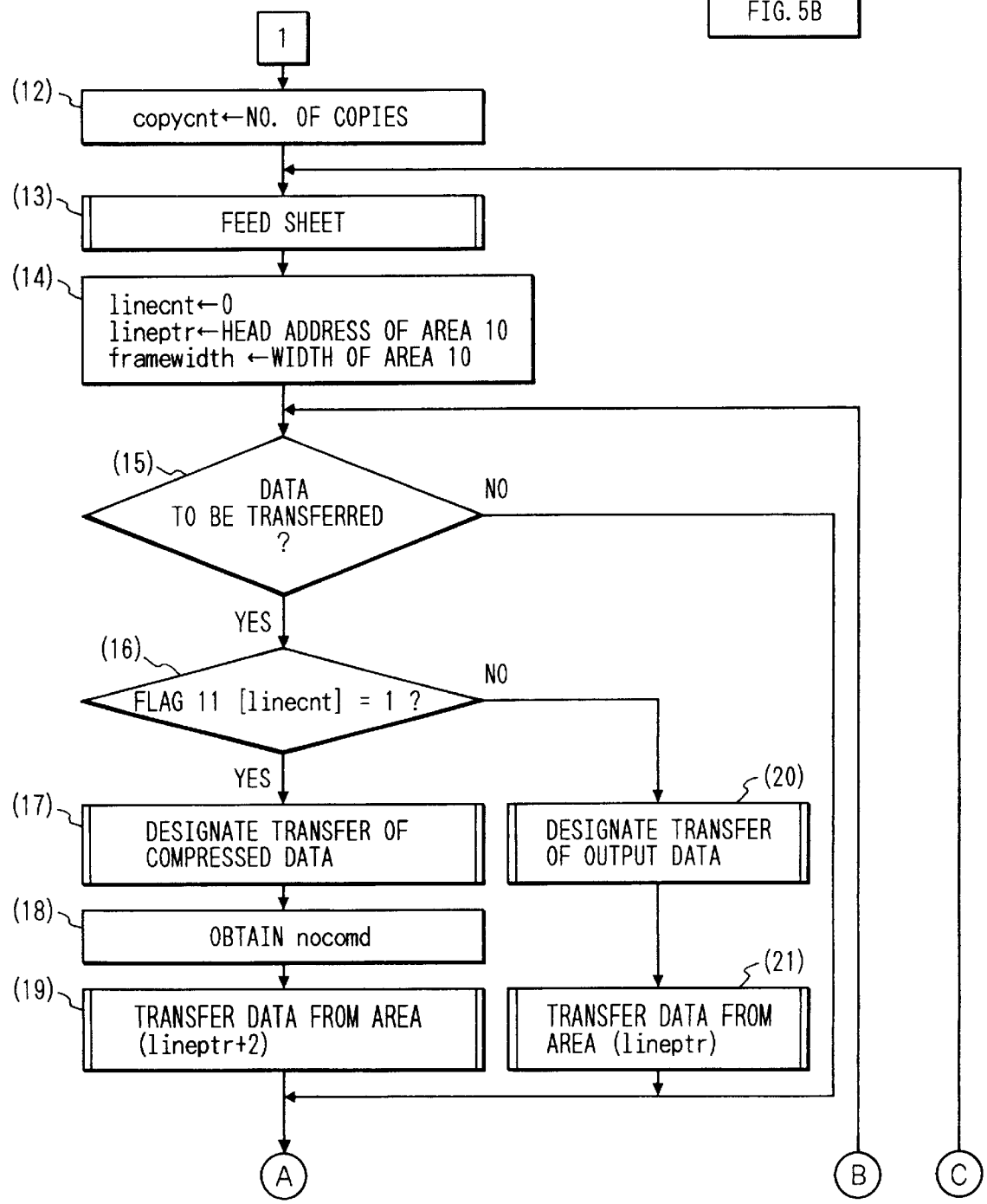

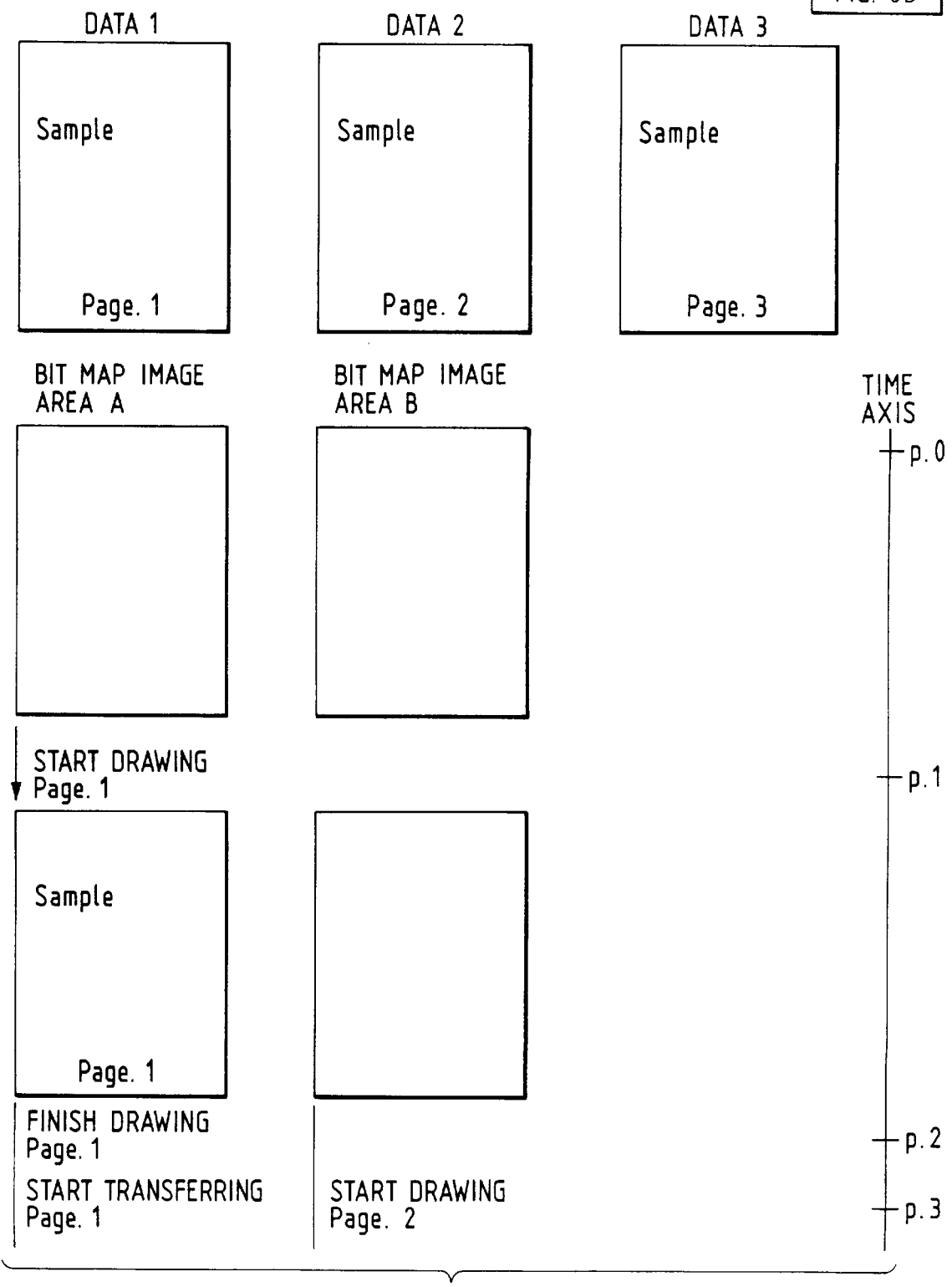

| PRINT METHOD | CONVERSION METHOD | | INDEX | PRINT MEDIUM |
|---|---|---|---|---|
| STANDARD | STANDARD | | [0] | STANDARD PAPER |
| HIGH QUALITY | STANDARD | | [1] | COATED PAPER |
| BLACK EMPHASIS | STANDARD | | [2] | OHP FILM |
| HIGH QUALITY | REVERSAL | | [3] | BACK PRINT FILM |
| HIGH QUALITY | STANDARD | | [4] | ENVELOP |

(a) DESIRED DATA (TNR)
(b) STANDARD PROCESSING (TNR)
(c) REVERSAL PROCESSING (ЯИТ)
(d) (TNR) REVERSE SIDE →

BIT MAP IMAGE AREA (FOR 1 PLANE)
BIT MAP IMAGE HEAD ADDRESS
HEIGHT
FRAME WIDTH

LINE DATA
REVERSE LEFT AND RIGHT BITS
REVERSE LEFT AND RIGHT BITS
REVERSE LEFT AND RIGHT BITS
REVERSE LEFT AND RIGHT BITS
REVERSE LEFT AND RIGHT BITS

| FIG. 13A |
| FIG. 13B |

| PRINT METHOD | CONVERSION METHOD | PAPER THICKNESS | FEED METHOD | INDEX | PRINT MEDIUM |
|---|---|---|---|---|---|
| STANDARD | STANDARD | THIN | CONTINUOUS | [0] | STANDARD PAPER |
| HIGH QUALITY | STANDARD | THIN | CONTINUOUS | [1] | COATED PAPER |
| BLACK EMPHASIS | STANDARD | THICK | SHEET-BY-SHEET | [2] | OHP FILM |
| HIGH QUALITY | REVERSAL | THICK | SHEET-BY-SHEET | [3] | BACK PRINT FILM |
| HIGH QUALITY | STANDARD | THICK | SHEET-BY-SHEET | [4] | ENVELOP |

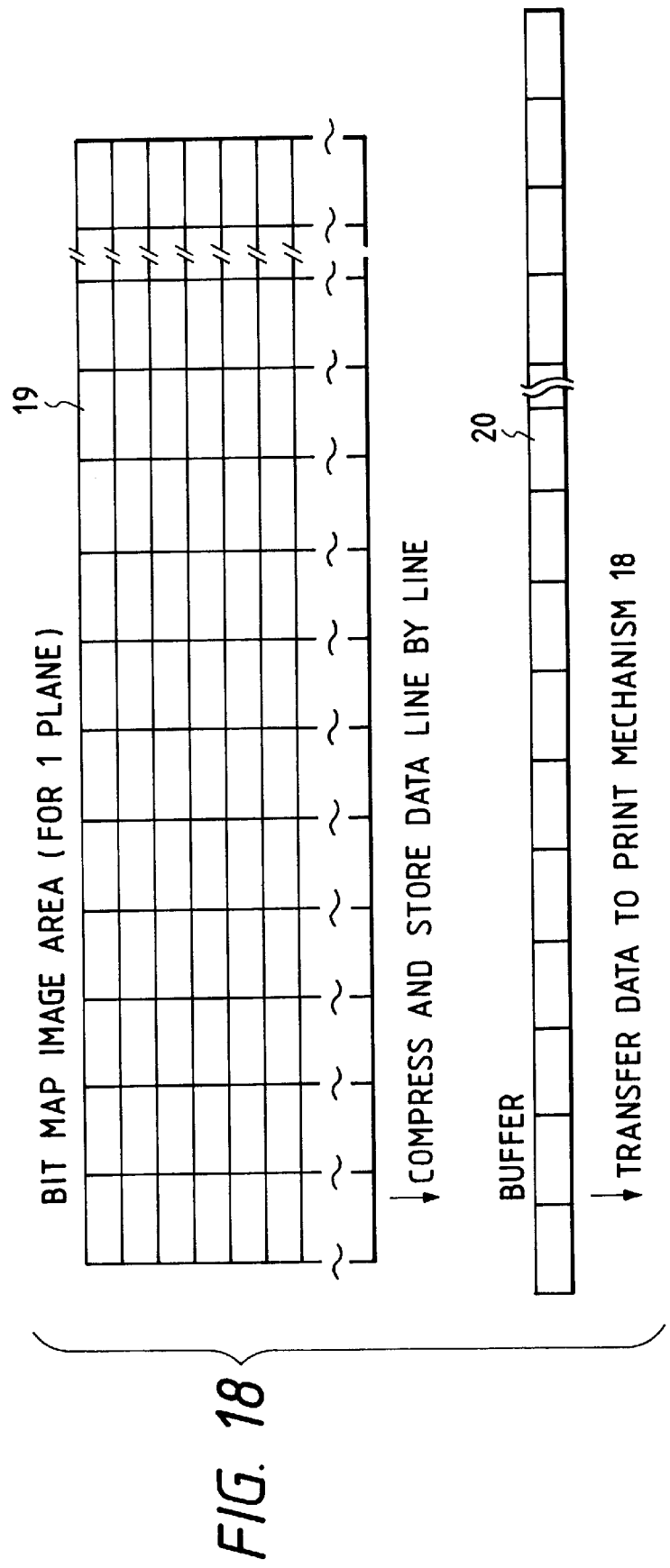

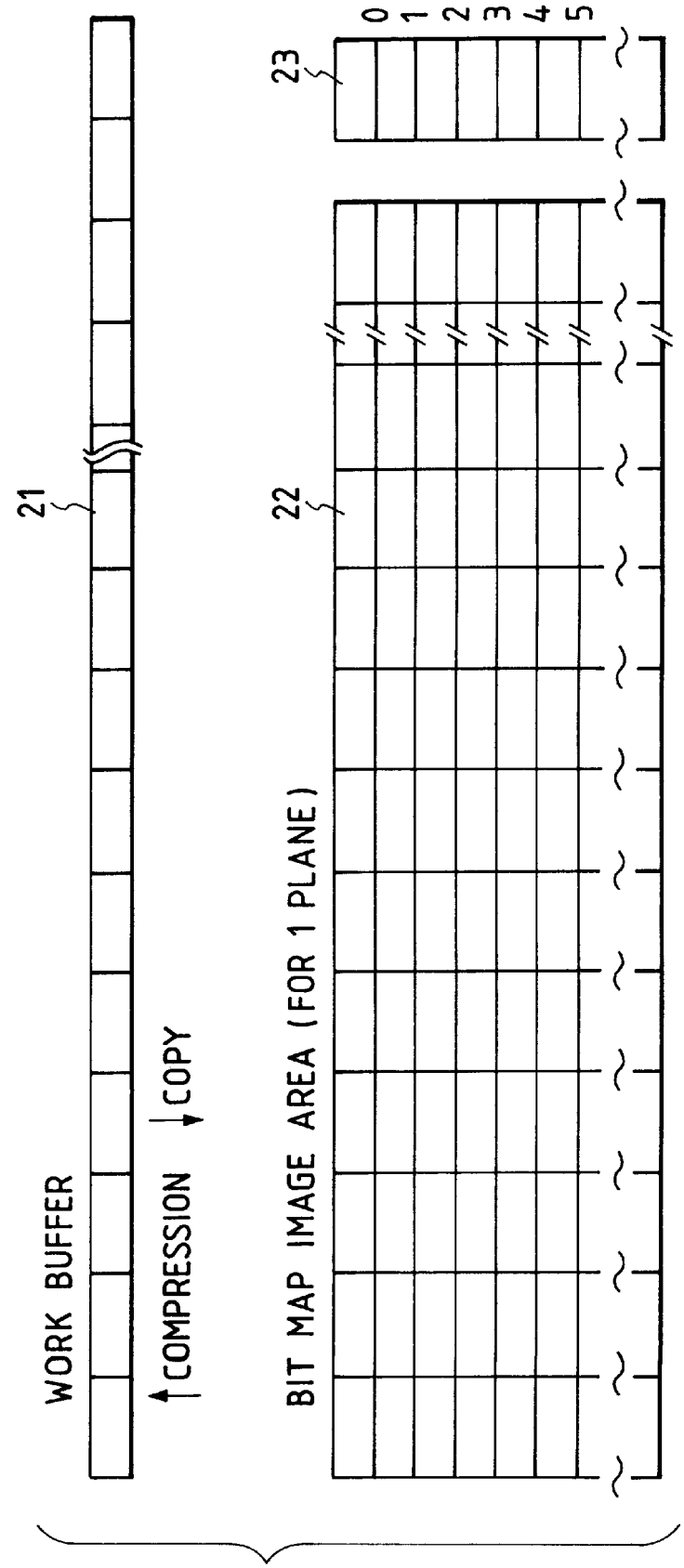

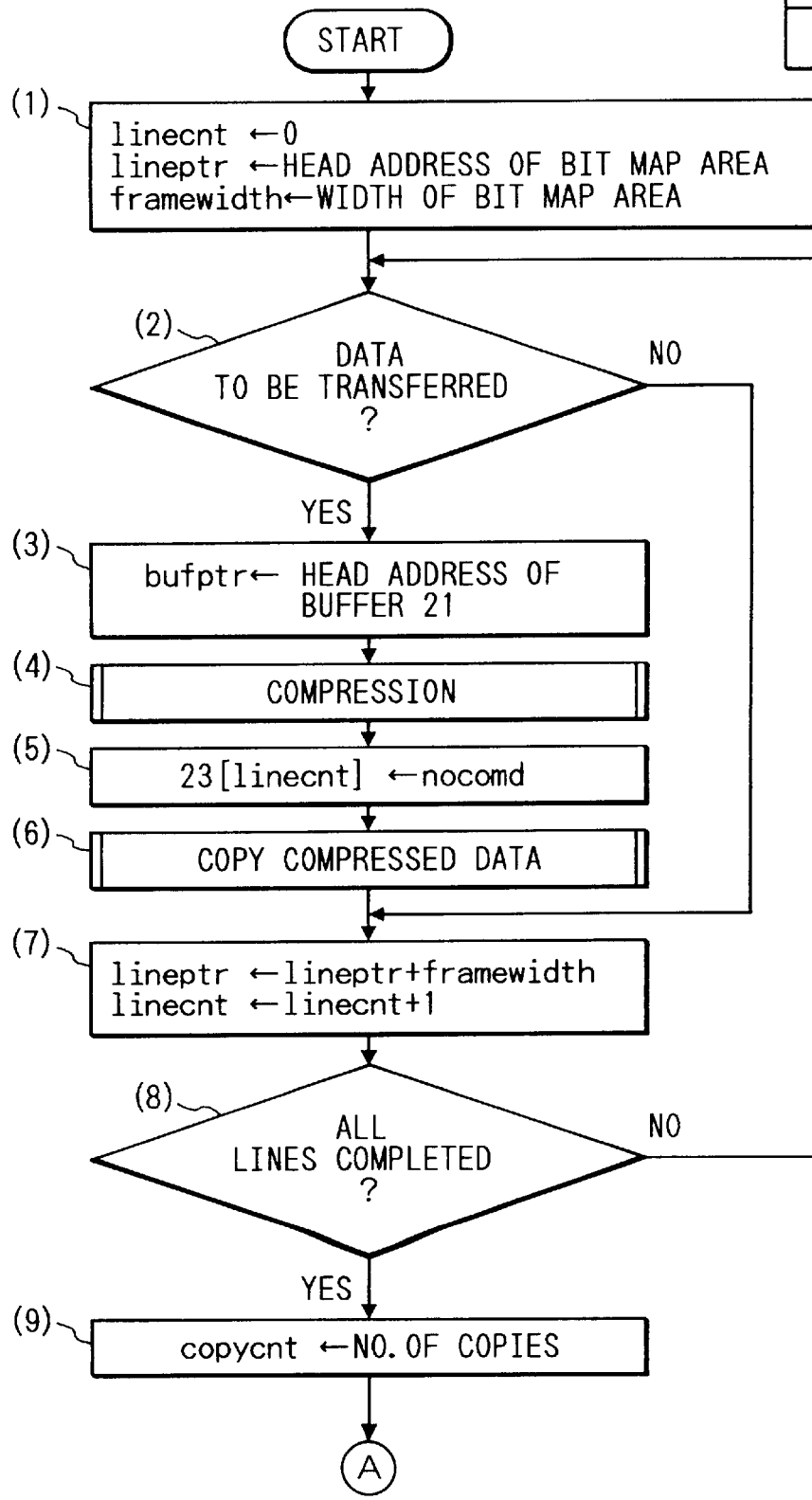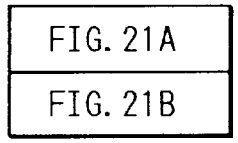

PRINT CONTROLLER, PRINTER, DATA TRANSFER METHOD, AND PRINTING CONDITION SETTING METHOD

BACKGROUND OF THE INVENTION

1. Field of the Invention

The present invention relates to a printer for receiving input data from an external apparatus such as a host computer or the like, and printing the received data on, e.g., a paper sheet, and a data transfer control method for the printer.

2. Related Background Art

In a conventional printer, a control unit and a print mechanism unit are connected in hardware and software manners via a specific interface/protocol determined therebetween. Bit map image data (including byte map data) created by the control unit is transferred to the print mechanism unit via the interface in the form of the bit map data, and is printed by the print mechanism unit on, e.g., a paper sheet.

A user must correctly designate various kinds of print method information such as a print medium, a print mode, and the like.

However, with the advent of high-resolution printers, color printers, and the like, the transfer amount of bit map image data is increasing, and data transfer executed via the interface requires a much longer period of time than a normal memory access depending on the conditions of the protocol processing (including processing for determining and setting the status of signal lines, and the like), the data width, and the like.

For this reason, the increase in data amount increases the processing cost and time required for the data transfer from the control unit to the print mechanism unit in the printer, and such loads inevitably lower the performance of the entire printer.

In particular, when bit map image data in a single page is repetitively transmitted to the print mechanism unit by, e.g., a copy function in the printer, since the drawing processing of a bit map has been completed, only the transfer processing time required for the single data accounts for most of the total processing time, and time for another input data processing cannot be assured.

In the above-mentioned prior art, a user designates a proper combination of a type of paper sheet and a print mode using an operation panel or control commands. In order to correctly designate a proper combination, the user must look up the combination in a manual. If the user designates a mis-matched combination of a paper sheet and a print mode, a print result that he or she intended cannot be obtained.

SUMMARY OF THE INVENTION

The present invention has been made in consideration of the above situation, and the object of the first to ninth embodiments of the present invention is to provide a print controller and a data transfer method, which can attain an efficient print operation while reducing the data amount to be transferred from the print controller to a printer engine and greatly shortening the data transfer time, in such a manner that data is transferred from the print controller to the printer engine while being appropriately compressed by the print controller, and the printer engine performs the print operation while appropriately expanding the transferred compressed data.

The first embodiment of the present invention is characterized by a print controller for transferring output data generated by analyzing input data received from a data source to a printer engine via a predetermined interface, comprising:

compression means for compressing the output data;

storage control means for selecting one of the compressed data compressed by the compression means and the output data as original data of the compressed data and storing the selected data in a memory; and transfer means for transferring the compressed data or the output data stored in the memory to the printer engine via the interface.

The second embodiment of the present invention is characterized in that the storage control means sequentially stores one of the compressed data and the output data in a common transfer data area in the memory.

The third embodiment of the present invention is characterized in that the storage control means compares data lengths of the compressed data and the output data, selects one data with a smaller data length, and stores the selected data in the memory.

The fourth embodiment of the present invention is characterized by a print controller for transferring output data generated by analyzing input data received from a data source to a printer engine via a predetermined interface, comprising:

compression means for compressing the output data stored in a second storage area of a memory for storing the output data during transfer of the output data from a first storage area of the memory to the printer engine via the predetermined interface; and transfer means for transferring the compressed data compressed by the compression means to the printer engine via the predetermined interface after the end of transfer of the output data stored in the first storage area.

The fifth embodiment of the present invention is characterized in that the compression means compresses the output data stored in the second storage area when a remaining amount of the output data to be transferred stored in the first storage area is larger than a predetermined amount.

The sixth embodiment of the present invention is characterized by a print controller for transferring output data generated by analyzing input data received from a data source to a printer engine via a predetermined interface, comprising:

discrimination means for discriminating if the output data is transferrable to the printer engine;

compression means for compressing the output data when the discrimination means determines that the output data is not transferrable; and transfer means for transferring the compressed data compressed by the compression means or the output data to the printer engine via the predetermined interface.

The seventh embodiment of the present invention is characterized by a data transfer method for a print controller for transferring output data generated by analyzing input data received from a data source to a printer engine via a predetermined interface, comprising:

the compression step of compressing the output data;

the storage control step of selecting one of the compressed data compressed in the compression step and the output data as original data of the compressed data and storing the selected data in a memory; and the transfer step of transferring the compressed data or the output data stored in the memory to the printer engine via the interface.

The eighth embodiment of the present invention is characterized by a data transfer method for a print controller for transferring output data generated by analyzing input data received from a data source to a printer engine via a predetermined interface, comprising:

the compression step of compressing the output data stored in a second storage area of a memory for storing the output data during transfer of the output data from a first storage area of the memory to the printer engine via the predetermined interface; and the transfer step of transferring the compressed data compressed in the compression step to the printer engine via the predetermined interface after the end of transfer of the output data stored in the first storage area.

The ninth embodiment of the present invention is characterized by a data transfer method for a print controller for transferring output data generated by analyzing input data received from a data source to a printer engine via a predetermined interface, comprising:

the discrimination step of discriminating if the output data is transferrable to the printer engine;

the compression step of compressing the output data when it is determined in the discrimination step that the output data is not transferrable; and the transfer step of transferring the compressed data compressed in the compression step or the output data to the printer engine via the predetermined interface.

The present invention has been made to solve the above-mentioned problems, and the object of the 10th to 17th embodiments is to provide a printer and a print condition setting method, which can obtain a proper print result by reducing the load of a print condition setting operation and can greatly improve data transfer processing efficiency to a printer engine in such a manner that a print processing condition corresponding to a designated print medium is automatically set, generated output data is compressed before it is transferred to the printer engine, the compressed output data is transferred to the printer engine, and the printer engine performs a print operation while expanding the compressed data.

The 10th embodiment of the present invention is characterized by a printer for printing output data, generated by analyzing input data received from a data source, using a printer engine, comprising:

storage means for storing a plurality of pieces of type information of a plurality of print media which can be used and print processing conditions of the printer engine corresponding to the type information; and setting means for setting the print processing condition for the printer engine by looking up the storage means on the basis of externally input type information of a print medium to be used.

The 11th embodiment of the present invention is characterized in that the print processing conditions include a reversal processing condition for the generated output data.

The 12th embodiment of the present invention is characterized in that the print processing conditions include a type condition of a print method.

The 13th embodiment of the present invention is characterized in that control means replaces a print method in the print processing condition read out from the storage means on the basis of the externally input type information by a print method based on externally input print method information in addition to the type information.

The 14th embodiment of the present invention is directed to a printer which comprises a print controller for generating output data by analyzing input data received from a data source, and a printer engine for printing the output data, characterized in that the print controller comprises compression means for compressing the generated output data.

The 15th embodiment of the present invention is characterized in that the compression means generates the compressed data by compressing the output data in units of predetermined bands.

The 16th embodiment of the present invention is characterized in that the compression means holds the compressed data until a print operation corresponding to an externally designated number of copies is completed.

The 17th embodiment of the present invention is characterized by a print condition setting method for a printer for printing output data, generated by analyzing input data received from a data source, using a printer engine, comprising:

the storage control step of storing a plurality of pieces of type information of a plurality of print media which can be used and print processing conditions of the printer engine corresponding to the type information in a memory; and the setting step of setting the print processing condition for the printer engine by looking up the memory on the basis of externally input type information of a print medium to be used.

BRIEF DESCRIPTION OF THE DRAWINGS

FIG. 4 is a flow chart showing the data transfer control method of the printer according to the present invention;

FIG. 18 is a view for explaining the relationship between the bit map image area and the transmission buffer assured on a RAM shown in FIG. 16;

FIG. 20 is a schematic view showing the transfer data processing state in the printer according to the present invention.

DESCRIPTION OF THE PREFERRED EMBODIMENTS

Figure 1:
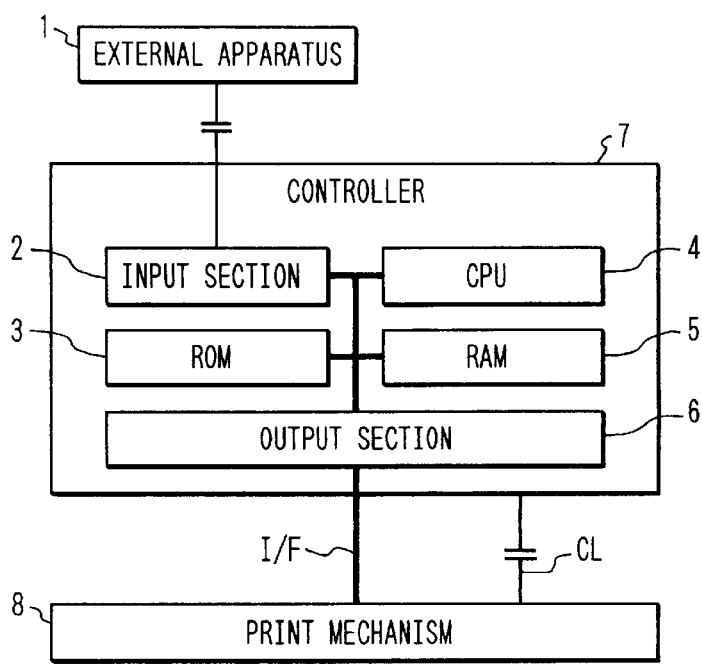
FIG. 1 is a block diagram for explaining the control arrangement of a printer to which the present invention can be applied.

FIG. 1 is a block diagram for explaining the control arrangement of a printer according to the first embodiment of the present invention. A case will be described below wherein the present invention is applied to an ink-jet printer as a serial printer.

Referring to FIG. 1, an external apparatus 1 such as a host computer supplies input data to the printer, and executes application software programs, and the like. An input section 2 receives input data supplied to the printer. A ROM 3 stores various control programs and various kinds of information such as output method information. The input data is, e.g., a page description language consisting of character codes and control codes.

A CPU 4 executes the various control programs stored in the ROM 3. The CPU 4 has a main function of performing page format processing by analyzing the input data and control commands received by the input section 2 in accordance with the control program, and executing, e.g., actual development processing, and the like. Furthermore, the CPU 4 controls the entire printer.

A RAM 5 is assigned to, e.g., a frame memory for storing output data (bit map image data) processed by the CPU 4. The RAM 5 also stores variables for storing print medium information, print method information, and the like. An output section 6 executes transmission processing of bit map image data developed on the RAM 5 to a print mechanism 8. In this embodiment, a group of the input section 2, the ROM 3, the CPU 4, the RAM 5, and the output section 6 will be referred to as a controller 7 hereinafter.

The print mechanism 8 comprises a printer engine for performing a print operation on, e.g., a paper sheet, and its controller. The print mechanism 8 and the output section 6 are connected to each other via a predetermined interface I/F (indicated by a bold line in FIG. 1), and the print mechanism 8 executes paper feed processing, print processing, convey processing, and paper delivery processing in accordance with a transmission instruction of output data from the output section 6. An example of the interface in this embodiment performs the print processing by transmitting output data from the output section 6 to the print mechanism 8 in units of lines, and generating a one-line convey (feed) instruction. Note that the present invention is suitably applied to an ink-jet printer engine as the printer engine. Alternatively, the present invention may be applied to a printer for scanning a print head, e.g., an ink-ribbon type printer engine. The print mechanism 8 includes a data expansion section (not shown; which may be realized in either a hardware or software manner). When it is determined that output data transferred from the controller 7 via the interface I/F is compressed data, the print mechanism 8 expands the compressed data to predetermined output data to perform the print processing; when it is determined that transfer data is output data, the print mechanism 8 prints the output data. In this manner, the print mechanism 8 can continuously perform a print operation on a recording medium independently of whether the transfer data is output data or compressed data.

A thin line connecting the output section 6 and the print mechanism 8 is a control line CL for acquiring the state (status) of the print mechanism 8.

The color print operation is performed by transmitting, for example, data of four designated colors (yellow, magenta, cyan, and black) via a single line, and thereafter, generating a one-line feed instruction. In this embodiment, since a similar pattern is merely repeated four times, the processing for only one color will be explained. Furthermore, a description of paper feed/delivery processing will be omitted.

Figure 2A:
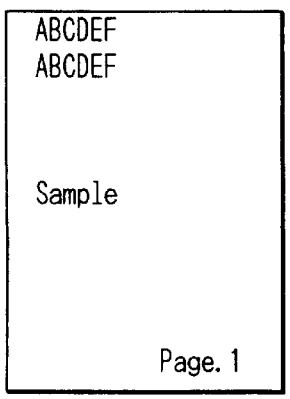
FIGS. 2A to 2C are views showing an example of bit map image data processed by a print mechanism unit shown in FIG. 1.
Figure 2B:
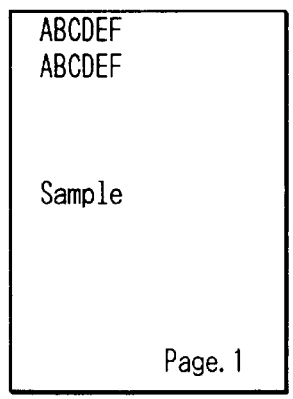
Figure 2C:
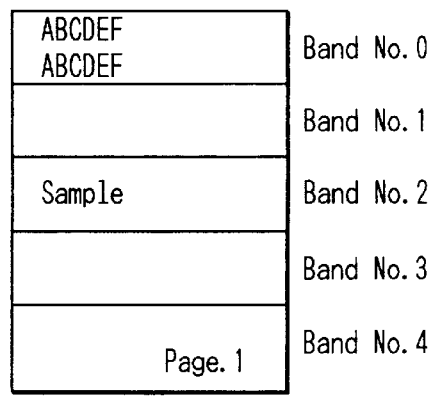

FIGS. 2A to 2C are views showing an example of bit map image data processed by the print mechanism 8 shown in FIG. 1. When an output result on a paper sheet shown in FIG. 2A is required, if the entire area for one page is assured as a bit map image area from the RAM 5, the data is directly drawn, as shown in FIG. 2B. When data for one page is to be divisionally drawn (i.e., band processing is to be performed), a bit map image area (band area) corresponding to, e.g., an area ⅕ the page height is assured from the RAM 5, as shown in FIG. 2C.

In this case, shift drawing processing and transfer processing are executed five times to draw and output bit map image data for one page. At this time, one of divided areas will be referred to as a band hereinafter, and in this case, five bands constitute one page.

Figure 3:
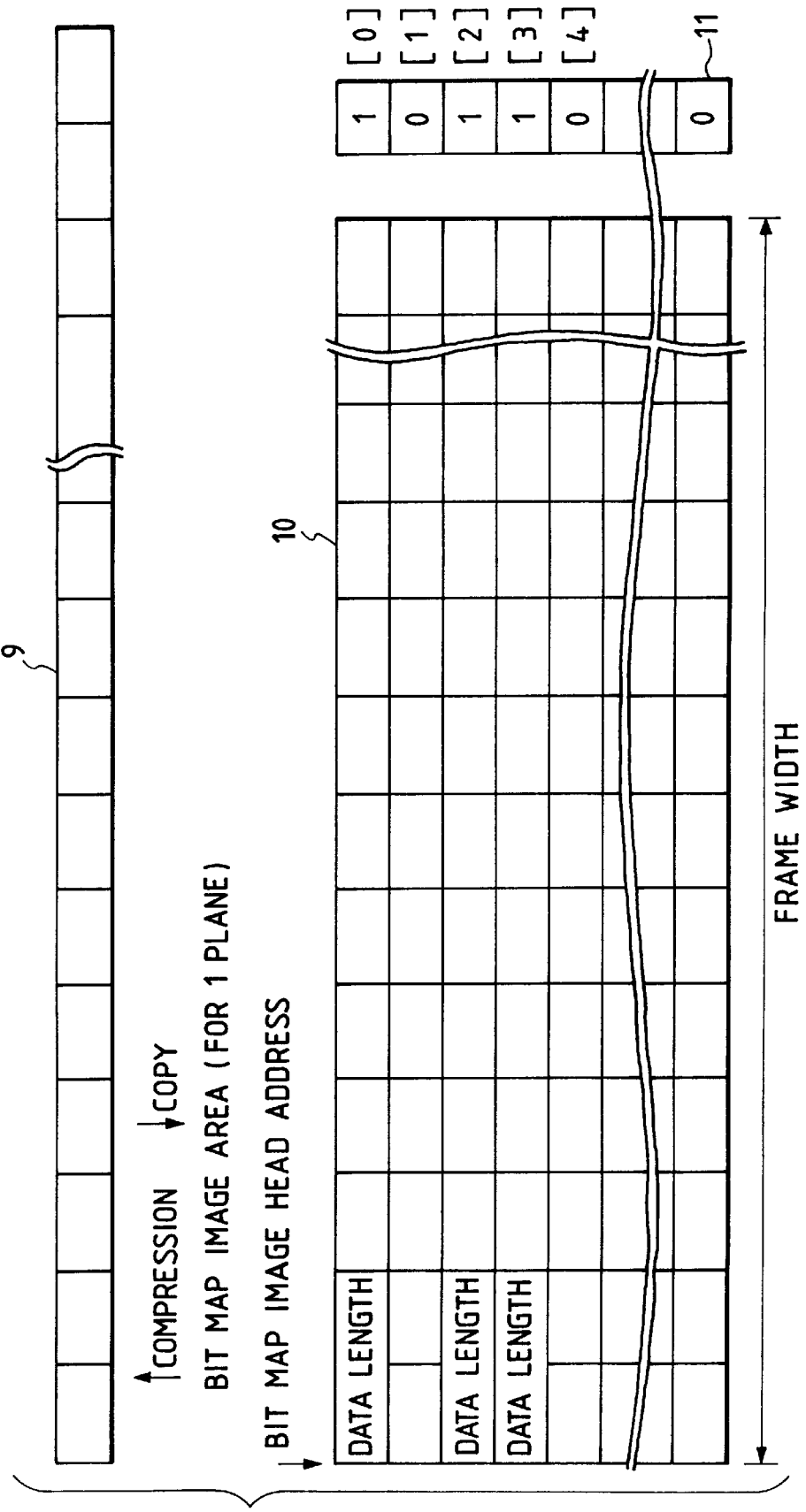
FIG. 3 is a view showing the processing state of output data to be transferred to the print mechanism unit shown in FIG. 1.

FIG. 3 shows the first output data processing state of data transferred to the print mechanism 8 shown in FIG. 1.

Referring to FIG. 3, a work buffer area 9 is used in compression processing, and is assured on the RAM 5 shown in FIG. 1. A normal bit map image area 10 is assured on the RAM 5 shown in FIG. 1. In this embodiment, the bit map image area also stores compression processing data in units of lines as follows. That is, data in each line for which the drawing processing has been finished are defined as original data, compressed data of the original data are generated in the compression processing work buffer 9, and the number of compressed data is compared with (the number of original data−2). If compression is found effective, the compressed data length is stored in a head 2-byte area of an original data area, and compressed data is copied to the remaining area.

A flag sequence 11 indicates the presence/absence of compression. In this embodiment, if the above-mentioned compression in units of lines is found effective, "1" is set; otherwise, "0" is set, thus allowing identification of data type upon transfer. This embodiment will be explained below with reference to FIGS. 1 to 3 and the like.

In the first embodiment, in the printer having a storage section (RAM 5) for storing bit image data (output data)

obtained by receiving input data from a data source (external apparatus 1) and analyzing the received input data, and the controller 7 for transferring the output data stored in the storage section to the print mechanism 8 having the printer engine via the predetermined interface, the controller 7 includes a data compression section (the CPU 4 constitutes means for compressing output data on the basis of a data compression program stored in the ROM 3) for compressing generated output data, and a first data selection section (the CPU 4 constitutes means for selecting data on the basis of a program stored in the ROM 3) for selecting one of the compressed data compressed by the data compression section and output data as original data of the compressed data, and writing the selected data in the storage section. The CPU 4 selects one of the compressed data and output data as original data of the compressed data, and writes the selected data in the RAM 5 as transfer data. The controller 7 transfers the compressed data or output data written in the RAM 5 to the print mechanism 8 as transfer data via the predetermined interface. In this manner, the amount of data to be transferred from the controller 7 to the print mechanism 8 can be reduced, and the transfer time can be shortened.

In the second embodiment, a first data discrimination section (realized by the CPU 4 in this embodiment) sequentially densely writes one of compressed data and output data as original data of the compressed data in a common transfer data area assured on the RAM 5, so that transfer data to be transferred is efficiently written.

In the third embodiment, a first data discrimination section (realized by the CPU 4 in this embodiment) compares the data lengths of compressed data and output data as original data of the compressed data, selects data with a smaller data length, and writes the selected data in the RAM 5, so that compressed data can be stored in place of original output data when a compression effect is obtained.

Figure 5B:
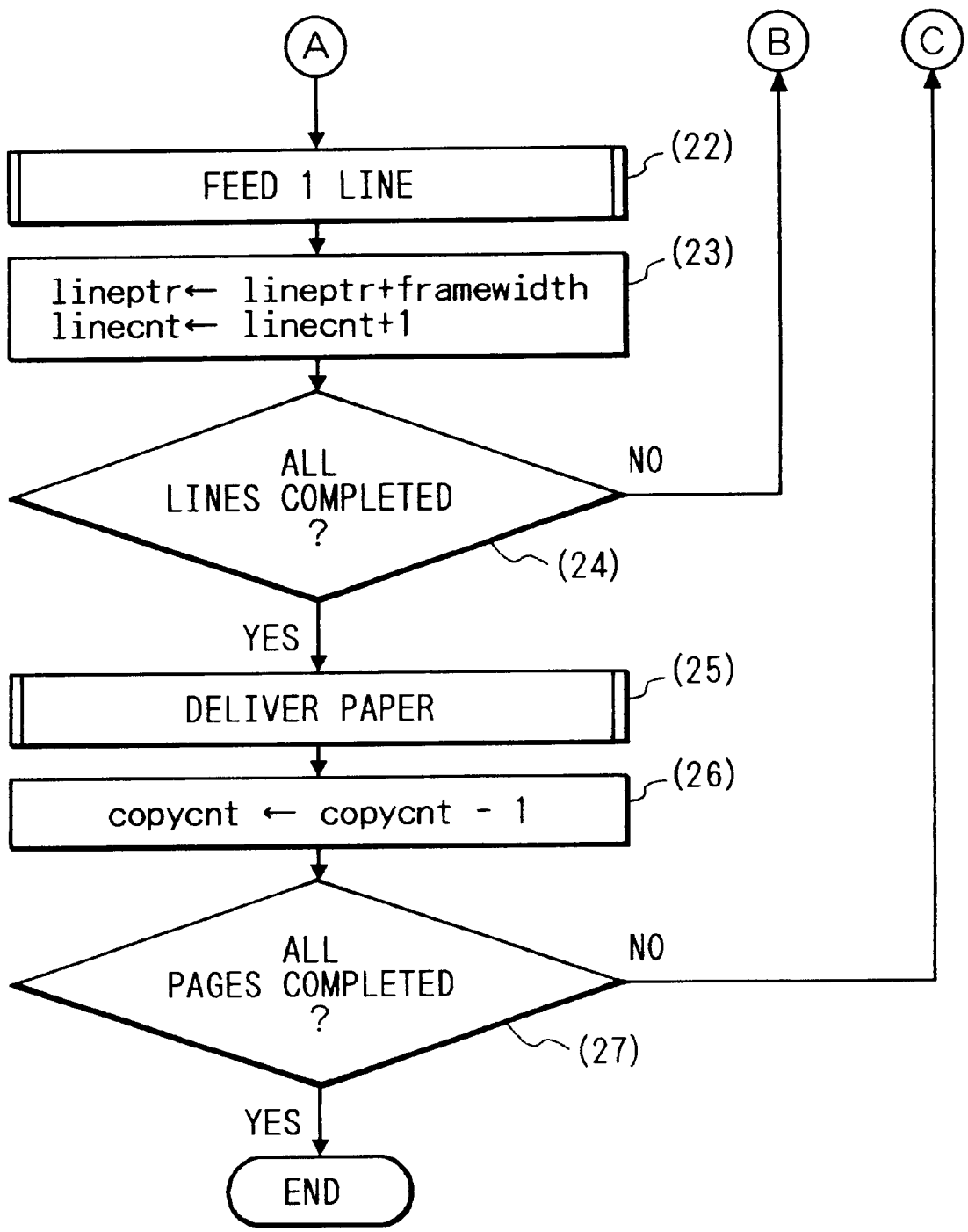
FIG. 5 is comprised of FIGS. 5A and 5B showing flow charts showing another data transfer control method of the printer according to the present invention.

FIGS. 4, 5A and 5B are flow charts showing the data transfer control method of the printer according to the present invention. Note that (1) to (27) indicate steps, and these flow charts include a case wherein full bit map data shown in FIG. 2B is output, and a case wherein data in one band shown in FIG. 2C is output. The control program shown in these flow charts is stored in the ROM 3, and is executed by the CPU 4.

A description will be started from a state wherein the drawing processing of bit map image data has been finished, and data is to be transferred from the output section 6 to the print mechanism 8. When multiple planes are used, the same processing is repeated in correspondence with the number of planes. For this reason, in this embodiment, processing for one plane will be described.

In data transfer, initialization is performed in step (1). More specifically, "0" is set in a variable linecnt indicating the number of transferred lines, the head address of the bit map image area 10 serving as a transfer source is set in a variable lineptr, and the width of the bit map image area 10 is set in a variable framewidth.

In step (2), it is checked by looking up a flag area (not shown) if transfer data to be printed is present in a raster to be currently transferred. This flag area is set by an instruction for drawing data in a corresponding line, an actual drawing operation, or the like in page layout processing, drawing processing, or the like, and means that no data is present in a line for which this flag is not set.

If transfer data to be printed is present, the head address of the work buffer 9 shown in FIG. 3 is set in a variable bufptr indicating the head address of a compressed data storage area in step (3). In step (4), a compression processing routine executes data compression processing using the original data head address lineptr, the compressed data storage address bufptr; and the original data length framewidth as arguments, and stores compressed data in turn from the compressed data storage address bufptr. After all the data are compressed and stored, the number of compressed data, nocomd, is returned as a return value.

In step (5), the number of compressed data, nocomd obtained as a return value in step (4) is compared with (the number of original data−2).

If the number of compressed data, nocomd, is smaller than (the number of original data−2), it is determined that the compression processing is effective, and "1" indicating a compression processing line is set in a (linecnt)-th flag in a compression presence/absence flag sequence 11 in step (6).

In step (7), the number of compressed data, nocomd, obtained as a return value in step (4) is set in a 2-byte area starting from the address indicated by the original data head address lineptr. In step (8), the compressed data area starting from the compressed data storage address bufptr is copied to the area indicated by (the original data start address lineptr+ 2) in correspondence with the number of compressed data.

In this way, the compression processing for the current line to be processed is finished.

On the other hand, if the number of compressed data, nocomd, is not smaller than (the number of original data−2) in step (5), "0" indicating a non-compressed data line is set in a (linecnt)-th flag in the compression presence/absence flag sequence 11 in step (9).

In either case, the bit map image width is added to the original data head address lineptr to update the current line to the next line, and the value of a line counter is incremented by "1", in step (10).

In step (11), it is checked based on linecnt if processing is completed for all the lines. If the processing is not completed for all the lines, the flow returns to step (2) to execute the same processing. If the processing is completed for all the lines, the control enters transfer processing for performing a print operation in practice.

In step (12) in FIG. 5A, the currently designated number of copies is set in a variable copycnt. Then, paper feed processing is performed (13). This processing is attained by transmitting a predetermined data string from the output section 6 to the print mechanism 8 or by controlling a signal line.

In step (14), initialization is performed. More specifically, "0" is set in the variable linecnt indicating the currently processed line number, the head address of the bit map image area 10 is set in the variable lineptr indicating the head address of the transfer line, and the frame width value of the bit map image area 10 is set in the variable framewidth indicating the number of data per line.

In step (15), it is checked by looking up a flag area (not shown) if data to be printed is present in a raster to be currently transferred. This flag area is set by an instruction for drawing data in a corresponding line, an actual drawing operation, or the like in page layout processing, drawing processing, or the like, and means that no data is present in a line for which this flag is not set.

If transfer data is present, a flag indicated by the variable linecnt in the compression presence/absence flag sequence 11 is looked up in step (16). If the flag is set to be "1" indicating a line subjected to the compression processing, a message indicating that compressed data is about to be transferred is supplied from the output section 6 to the print mechanism 8 in step (17).

This operation is attained by a predetermined data string determined as the interface or by controlling a signal line (using the control line CL in FIG. 1 in this embodiment). In step (18), the number of compressed data, nocomd, is read out from the 2-byte area starting from the address indicated by lineptr. In step (19), data corresponding to the number of data read out in step (18) are transferred from the area indicated by (the variable lineptr+2) as one line.

The print mechanism 8 processes the compressed data transferred as the transfer data.

On the other hand, if the corresponding contents of the compression presence/absence flag sequence are "0" indicating non-compression in step (16), transfer of output data is designated in step (20).

In step (21), output data of the corresponding framewidth are transferred from the head address indicated by the variable lineptr. Then, the print mechanism 8 processes the output data transferred as the transfer data.

In step (22), one-line feed processing is executed to advance the print line of the print mechanism 8 side by one line. This step is also executed when it is determined in step (15) that no transfer data is present.

In step (23), one-line updating processing of the controller 7 side is attained by adding framewidth as the bit map image area width to the variable lineptr, and linecnt is also incremented by "1".

In step (24), it is checked based on the variable linecnt if transfer processing is completed for all the lines. If the transfer processing is not completed for all the lines, the flow returns to step (15) to similarly process the remaining lines.

On the other hand, if it is determined in step (24) that the transfer processing is completed for all the lines, paper delivery processing is executed in step (25).

This processing is attained by the interface determined between the output section 6 and the print mechanism 8. In this manner, the transfer processing for one page is completed.

In step (26), the variable copycnt indicating the number of copies is decremented by "1". In step (27), it is checked by looking up copycnt if the output processing is completed for all the pages. If pages to be copied still remain, the flow returns to step (13) to perform the print operation on the next paper sheet.

On the other hand, if it is determined in step (27) that the output processing is completed for all the pages, the processing ends.

The seventh embodiment will be described below with reference to FIGS. 1, 4, 5A and 5B, and the like.

According to the seventh embodiment, in a data transfer control method for a printer which comprises a storage section (RAM 5) for storing bit image data (output data) generated by receiving input data from a data source (external apparatus 1) and analyzing the received input data, and the controller 7 for transferring the output data stored in the storage section to the print mechanism 8 comprising the printer engine via the predetermined interface I/F, the data compression step (step (8) in FIG. 4) of compressing the output data, the first data selection step (step (16) in FIG. 5A) of selecting one of the compressed data or the output data as the original data of the compressed data and writing the selected data in the storage section, and the transfer step (steps (17) to (19) or steps (20) and (21) in FIG. 5A) of transferring the compressed or output data written in the storage section to the print mechanism 8 via the predetermined interface as transfer data are executed, thereby reducing the amount of data to be transferred from the controller 7 to the print mechanism and shortening the transfer time.

Figure 6B:
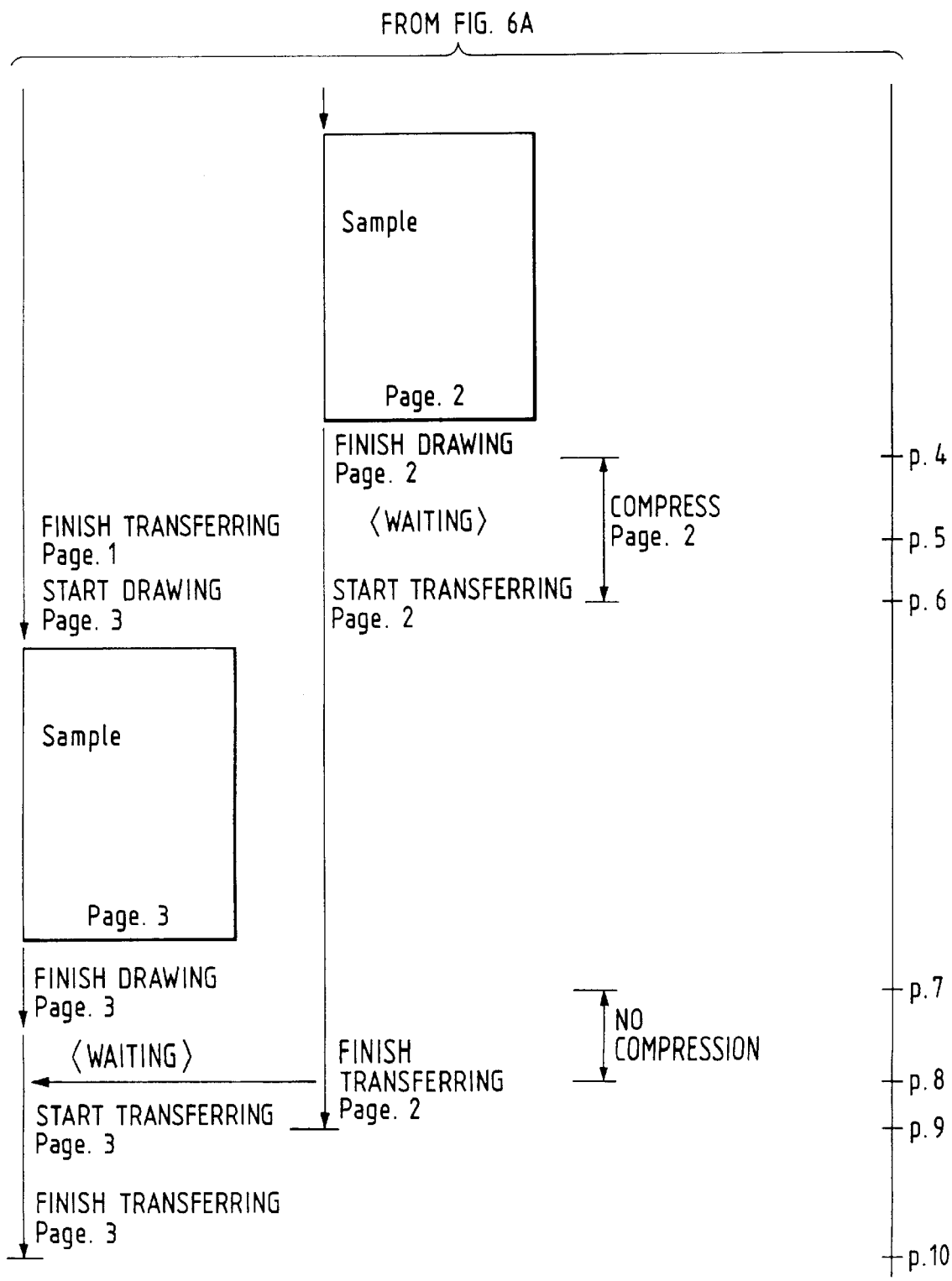
FIG. 6 is comprised of FIGS. 6A and 6B illustrating transition diagrams showing another processing state of output data to be transferred to the print mechanism unit shown in FIG. 1.

FIGS. 6A and 6B are transition diagrams showing the second output data processing state of data transferred to the print mechanism 8 shown in FIG. 1.

FIGS. 6A and 6B illustrate a case wherein 3-page data (page data) consisting of data (1) to (3) are to be printed, and there are a plurality of (two in this embodiment) bit map image areas (assured on the RAM 5 in FIG. 1 in this embodiment). The two bit map image areas are respectively represented by (A) and (B).

Note that the time axis in FIGS. 6A and 6B indicate points corresponding to a time sequence of events for a descriptive purpose, and the ratio of times between each two adjacent points does not always coincide with the real time ratio.

At the time axis p.0 (a description of "time axis" will be omitted hereinafter, and will be simply described as "p.0"), the two bit map image areas are "vacant". When data (1) to (3) in FIGS. 6A and 6B are to be printed from this state, the drawing processing on the bit map image area (A) is started at p.1, and is finished at p.2.

At p.3, the transfer processing of data in the bit map image area (A) is started. The transfer processing is executed parallel to the drawing control processing. At this time, since the page data (2) is already present, the bit map image area is switched to (B), and the drawing processing is started.

Upon completion of the drawing processing at p.4, when the print processing requires a relatively long period of time like in, e.g., a serial printer, the drawing processing is finished earlier than the transfer processing to the print mechanism 8, and the transfer processing of data in the bit map image area (B) cannot be started until the processing for the bit map image area (A) is finished. For this reason, since the system is undesirably set in a waiting state, the system performance is lowered.

In view of this problem, when the compression processing of data in the bit map image area is performed in this waiting time, the next data transfer processing can be attained at higher speed. However, if the compression processing is started when only several lines to be transferred remain, the print mechanism 8 must wait for the end of the compression processing. For this reason, when a predetermined number of lines to be transferred remain, the compression processing is performed; otherwise, it is determined that the transfer processing will be finished soon, and the normal transfer processing is performed without forcibly starting the compression processing.

In the illustrated case, the number of lines to be transferred is larger than the predetermined number of lines at p.4. In this case, the compression processing is performed.

Since the transfer processing of data in the bit map image area (A) is finished at p.5, the transfer processing of the compressed data in the bit map image area (B) is started at p.6. At the same time, since the page data (3) is present, the target of the drawing processing is switched to the bit map image area (A), and the drawing processing is started.

Upon completion of the drawing processing at p.7, it is determined that the number of lines to be transferred of the page data corresponding to the bit map image area (B), which is being subjected to the transfer processing, is equal to or smaller than the predetermined number of lines described above. Thus, no compression processing is performed, and the system simply waits until the transfer processing is finished. Upon completion of the transfer processing of data in the bit map image area (B), the transfer processing of data in the bit map image area (A) is started in turn. The transfer processing of data in the bit map image area (A) is finished at p.10. The control method of the seventh embodiment has been described.

The fourth and fifth embodiments will be explained below with reference to FIGS. 1, 6A and 6B, and the like.

According to the fourth embodiment, in a printer, which comprises a plurality of storage sections (in this embodiment, for example, paint memories or frame memories on which a full-image is developed are assured for, e.g., two pages, on the RAM 5) for storing, in units of frames, bit image data (output data) generated by receiving input data from a data source (external apparatus 1) and analyzing the received input data, the controller 7 for transferring the output data stored in these storage sections to the print mechanism 8 comprising the printer engine via the predetermined interface I/F, the controller 7 comprises a discrimination section (CPU 4) for discriminating the remaining amount state of transfer data which is being transferred from one storage section to the print mechanism via the predetermined interface I/F upon completion of development of the bit image data onto the other storage section, and a compression section (realized as means based on a compression program stored in the ROM 3) for writing compressed data, obtained by compressing output data developed as bit image data onto the other storage section, in the other storage section on the basis of the discrimination result of the discrimination section. The CPU 4 discriminates the remaining amount state of transfer data, which is being transferred from one storage section (a data area (A) shown in FIG. 6A assured on the RAM 5) to the print mechanism 8 via the predetermined interface upon completion of development of bit image data onto the other storage section (a data area (B) shown in FIGS. 6A assured on the RAM 5). The compression section writes compressed data obtained by compressing the output data, which is developed as bit image data onto the other storage section, in the other storage section on the basis of the discrimination result of the CPU 4. Upon completion of transfer of the transfer data from one storage section, the controller transfers the compressed data written in the other storage section as the next transfer data to the print mechanism via the predetermined interface. In this manner, the amount of data to be transferred from each storage section can be reduced, and the transfer time can be shortened.

According to the fifth embodiment, when the discrimination section (CPU 4) discriminates that the remaining amount of transfer data, which is being transferred, is larger than a predetermined amount, it writes compressed data obtained by compressing the output data, which is developed as bit image data on the other storage section (the data area (B) shown in FIG. 6A assured on the RAM 5), in the other storage section. In this manner, the compressed data is written in the other storage section before completion of data transfer from one storage section in correspondence with the transfer state of the transfer data which is being transferred, thereby reducing the amount of data transferred from the other storage section (the data area (B) shown in FIG. 6A assured on the RAM 5) upon completion of transfer of data from one storage section (the data area (A) shown in FIG. 6A assured on the RAM 5), and reducing the data transfer time.

Figure 7:
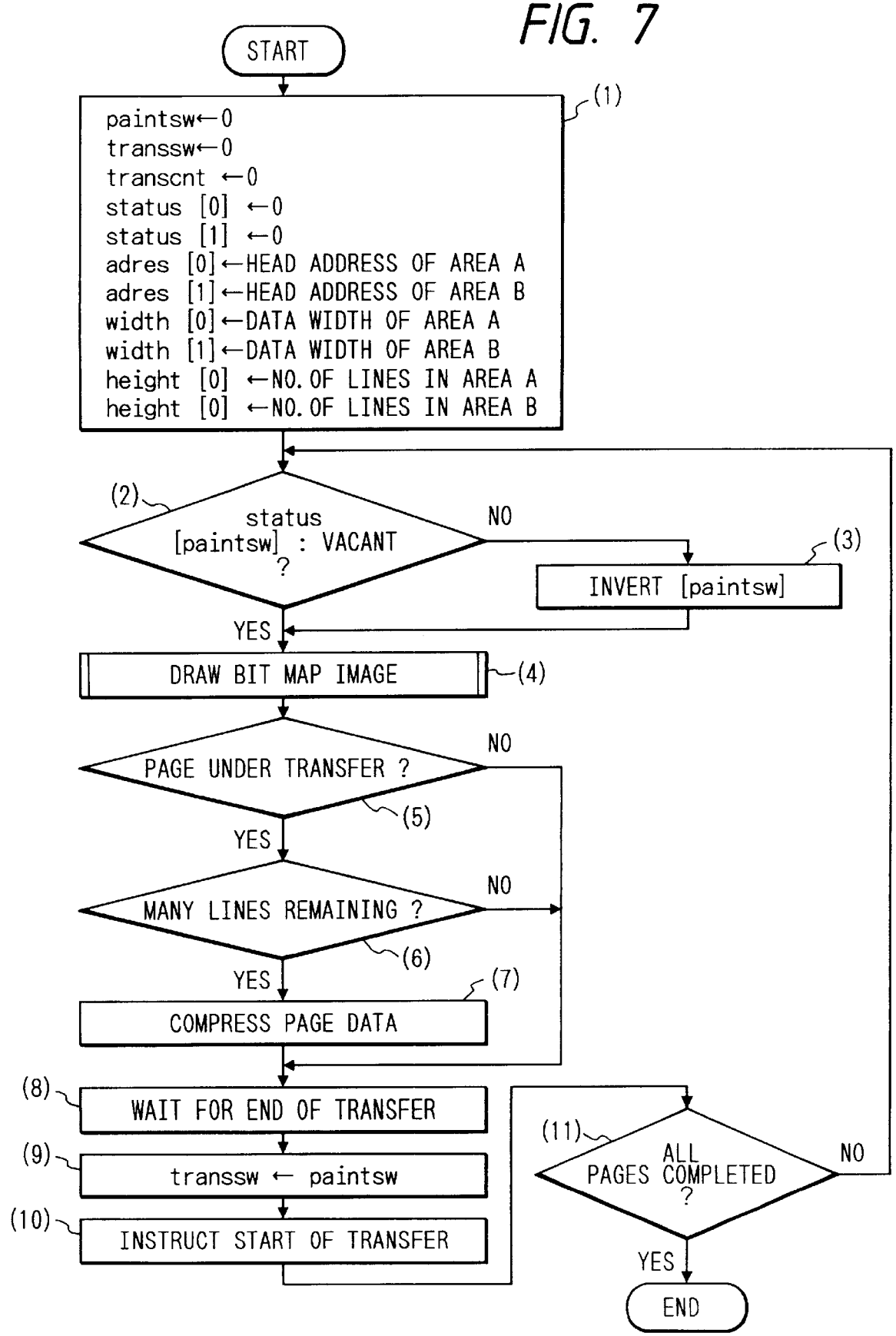
FIG. 7 is a flow chart showing still another data transfer control method of the printer according to the present invention.
Figure 8:
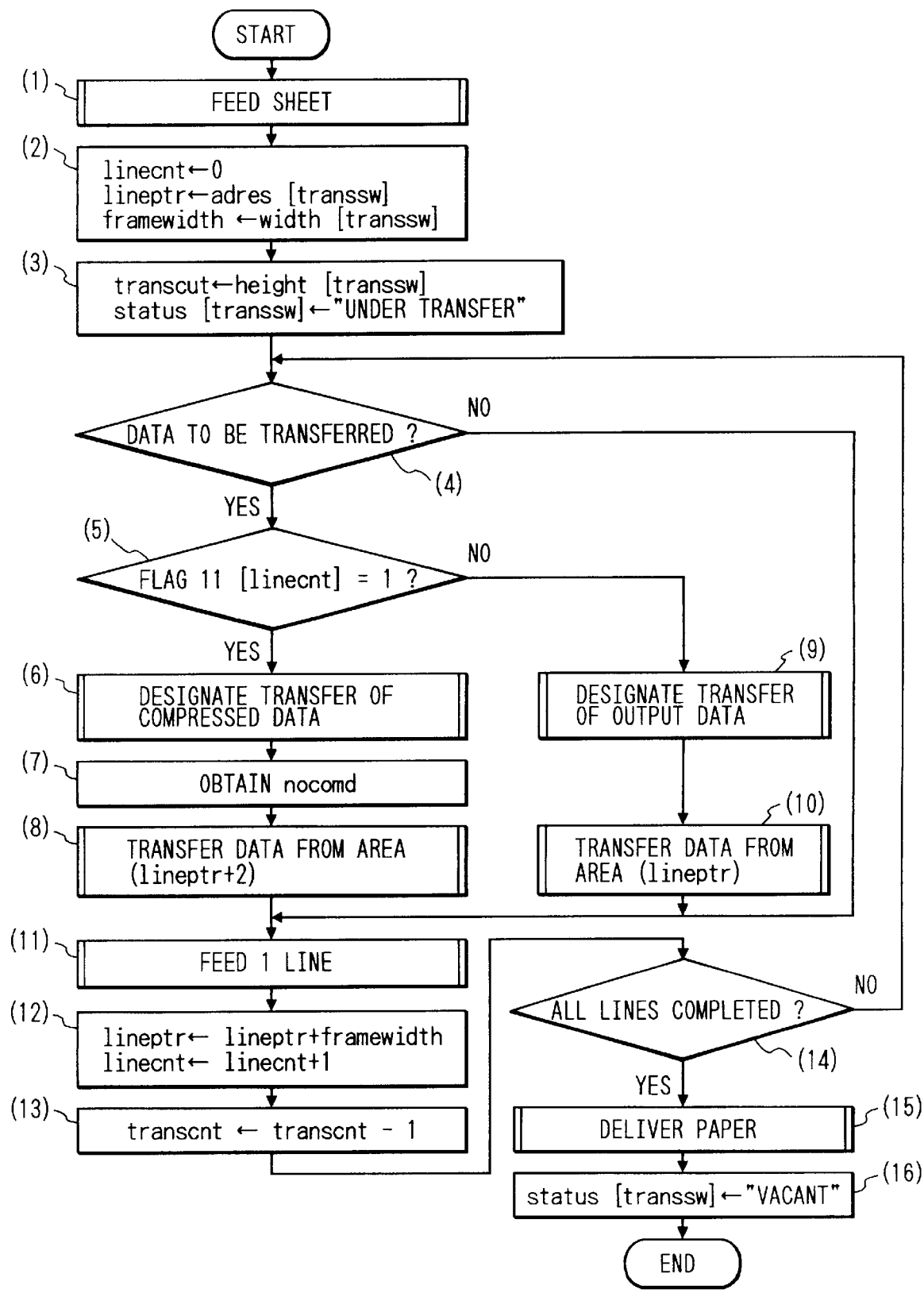
FIG. 8 is a flow chart showing still another data transfer control method of the printer according to the present invention.

FIGS. 7 and 8 are flow charts showing the second data control method for the printer according to the present invention. Especially, in this embodiment, since the control processing (including the drawing processing) and the data transfer processing are executed by parallel processing, as has been described with reference to FIGS. 6A and 6B, the flow chart is divided into two parts, i.e., a control processing part and a transfer processing part. FIG. 7 corresponds to the control processing part, and FIG. 8 corresponds to the transfer processing part. The control processing part in FIG. 7 will be described first. Note that (1) to (11) in FIG. 7 and (1) to (16) in FIG. 8 represent steps. The control program shown in these flow charts is stored in the ROM 3 and is executed by the CPU 4.

When page data to be drawn is present, the output control is started by the controller 7, and initialization is performed in step (1). More specifically, a numerical value "0" indicating the bit map image area (A) is set in a variable paintsw indicating the bit map image area to be subjected to the drawing processing, "0" is set in a variable transsw indicating the bit map image area to be subjected to the transfer processing, "0" is set in a variable transcnt indicating the number of remaining lines to be transferred, and a numerical value "0" indicating a vacant state is set in sequences status[0] and status [1] indicating the states of the bit map image areas, respectively.

In addition, the values of the bit map image areas (A) and (B) are respectively set in sequences adres[0] and adres[1] indicating the head addresses of the bit map image areas, width[0] and width[1] indicating the data widths, and height [0] and height[1] indicating the numbers of lines.

In step (2), the state of the bit map image area to be subjected to the drawing processing is checked. If the area is vacant, the bit map image area indicated by the variable paintsw is set to be a drawing target area; otherwise, since the area is being subjected to the transfer processing, the value of the variable paintsw is inverted from "0" to "1"if the current target area is "0" or vice versa in step (3). Since the two areas are not subjected to the transfer processing concurrently, the variable paintsw indicates the other bit map image area.

In step (4), the drawing processing is performed on the bit map image area indicated by adres[paintsw], width [paintsw], and height[paintsw] using the variable paintsw as an index as in the conventional system.

In step (5), it is checked based on the variable transcnt indicating the number of remaining lines to be transferred if there is page data which is being transferred. If the variable transcnt is not "0", since data is being transferred, the variable transcnt is compared with a predetermined number of remaining lines, which is pre-stored in the ROM 3 and is used for determining whether or not compression processing is to be performed, in step (6). If the number of remaining lines is larger than the pre-stored value, page compression processing is performed in step (7). This processing is the same as that in the above embodiment.

On the other hand, if there is no page data which is being transferred in step (5), or if the number of remaining lines to be transferred is smaller than the pre-stored value in step (6), the control waits for the end of transfer until transcnt becomes "0", in step (8). Upon completion of the transfer processing, the value of paintsw is set in the variable transsw indicating the bit map image area to be subjected to the transfer processing to switch the bit map image area to be subjected to the transfer processing in step (9). In step (10), a transfer start instruction is generated. In response to the transfer start instruction, the transfer processing shown in FIG. 8 is started as the parallel processing.

In step (11), it is checked if page data, which waits for the drawing processing, remains. If such page data remains, the flow returns to step (2) to perform the drawing processing of the next page data; otherwise, the processing ends.

The transfer processing started in response to the transfer start instruction will be explained below with reference to the flow chart in FIG. 8.

In response to the transfer start instruction, paper feed processing is performed in step (1). This processing is attained by transmitting a predetermined data string from the output section 6 to the print mechanism 8 or by controlling a signal line (using the control line CL in this embodiment).

In step (2), initialization is performed. More specifically, "0" is set in the variable linecnt indicating the currently processed line number, adres[transsw] is set in the variable lineptr indicating the head address of a line to be transferred, and width[transsw] as the frame width value of the bit map image area is set in the variable framewidth indicating the number of data per line.

In step (3), height[transsw] is set in the variable transcnt indicating the number of remaining lines to be transferred, and a numerical value indicating "under transfer" is set in the status sequence status[transsw] indicating the state of the bit map image area.

In step (4), it is checked by looking up a flag area (not shown) if transfer data to be printed is present in a raster to be currently transferred. This flag area is set by an instruction for drawing data in a corresponding line, an actual drawing operation, or the like in page layout processing, drawing processing, or the like, and means that no data is present in a line for which this flag is not set.

If it is determined that transfer data is present, a (linecnt)-th flag in the compression presence/absence flag sequence 11 is checked in step (5). If this flag is "1" indicating a line which has been subjected to the compression processing, a message indicating that compressed data is about to be transferred is supplied from the output section 6 to the print mechanism 8 in step (6).

This operation is attained by a data string determined as the interface or controlling the signal line (using the control line CL in FIG. 1 in this embodiment).

In step (7), the number of compressed data, nocomd, is read out from the 2-byte area starting from the address indicated by the variable lineptr. In step (8), data corresponding to the number of data read out in step (7) are transferred from the area indicated by (lineptr+2) as one line. The print mechanism 8 processes the compressed data transferred as the transfer data.

On the other hand, if the corresponding contents of the compression presence/absence flag sequence are "0" indicating non-compression in step (5), transfer of output data is designated in step (9). In step (10), output data of the corresponding framewidth are transferred from the head address indicated by the variable lineptr. Then, the print mechanism 8 processes the output data transferred as the transfer data.

In step (11), one-line feed processing is executed to advance the print line of the print mechanism 8 side by one line. This step is also executed when it is determined in step (4) that no transfer data is present.

In step (12), one-line updating processing of the controller 7 side is attained by adding framewidth as the bit map image area width to the variable lineptr, and linecnt is also incremented by "1".

In step (13), the number transcnt of remaining lines to be transferred is decremented by "1". The controller 7 executes the processing while looking up this variable.

In step (14), it is checked based on the variable linecnt if transfer processing is completed for all the lines. If the transfer processing is not completed for all the line, the flow returns to step (4) to similarly process the remaining lines.

On the other hand, if it is determined in step (14) that the transfer processing is completed for all the lines, paper delivery processing is executed in step (15). This processing is attained by the interface determined between the output section 6 and the print mechanism 8 as in the paper feed processing.

In step (16), a numerical value indicating a vacant state is set in the status sequence status[transsw] of the bit map image area for which the transfer processing is completed.

In this manner, the transfer processing for one page is completed. Since the two processing operations (the step processing operations shown in FIGS. 7 and 8) are executed parallel to each other, compression and transfer processing operations suitable for the status of the printer system can be executed. In the above description, a description of copy count processing is omitted.

In the above description, only a case wherein the full-bit map area is assured has been exemplified. When page data is divided into band image buffers shown in FIG. 2C, if there are a plurality of band image areas, the present invention is applicable. The eighth embodiment will be described below with reference to FIGS. 1, 6A, 6B, 7, and 8, and the like.

According to the eighth embodiment, in a data transfer control method for a printer which comprises a plurality of storage sections (for example, frame memories for two pages in units of pages assured on the RAM 5) for storing bit image data (output data) generated by receiving input data from a data source (external apparatus 1) and analyzing the received input data, and the controller 7 for transferring the output data stored in these storage sections to the print mechanism 8 comprising the printer engine via the predetermined interface I/F, the discrimination step (steps (4) to (6) in FIG. 7) of discriminating the remaining amount state of transfer data which is being transferred from one storage section (the data area (A) shown in FIG. 6A assured on the RAM 5) to the print mechanism 8 upon completion of development of bit image data onto the other storage section (the data area (B) shown in FIG. 6A assured on the RAM 5), the compression step (step (7) in FIG. 7) of writing compressed data, obtained by compressing the output data developed as bit image data on the other storage section, in the other storage section, and the transfer step (steps (4) to (6) in FIG. 8 or steps (4), (5), and (9) in FIG. 8) of transferring the compressed data written in the other storage section to the printer mechanism 8 via the predetermined interface as the next transfer data are executed, so that the compressed data, obtained by compressing the output data, which has been developed as bit image data on the other storage section, at a proper timing without disturbing the next data transfer can be transferred to the print mechanism 8 within a short period of time.

Figure 9:
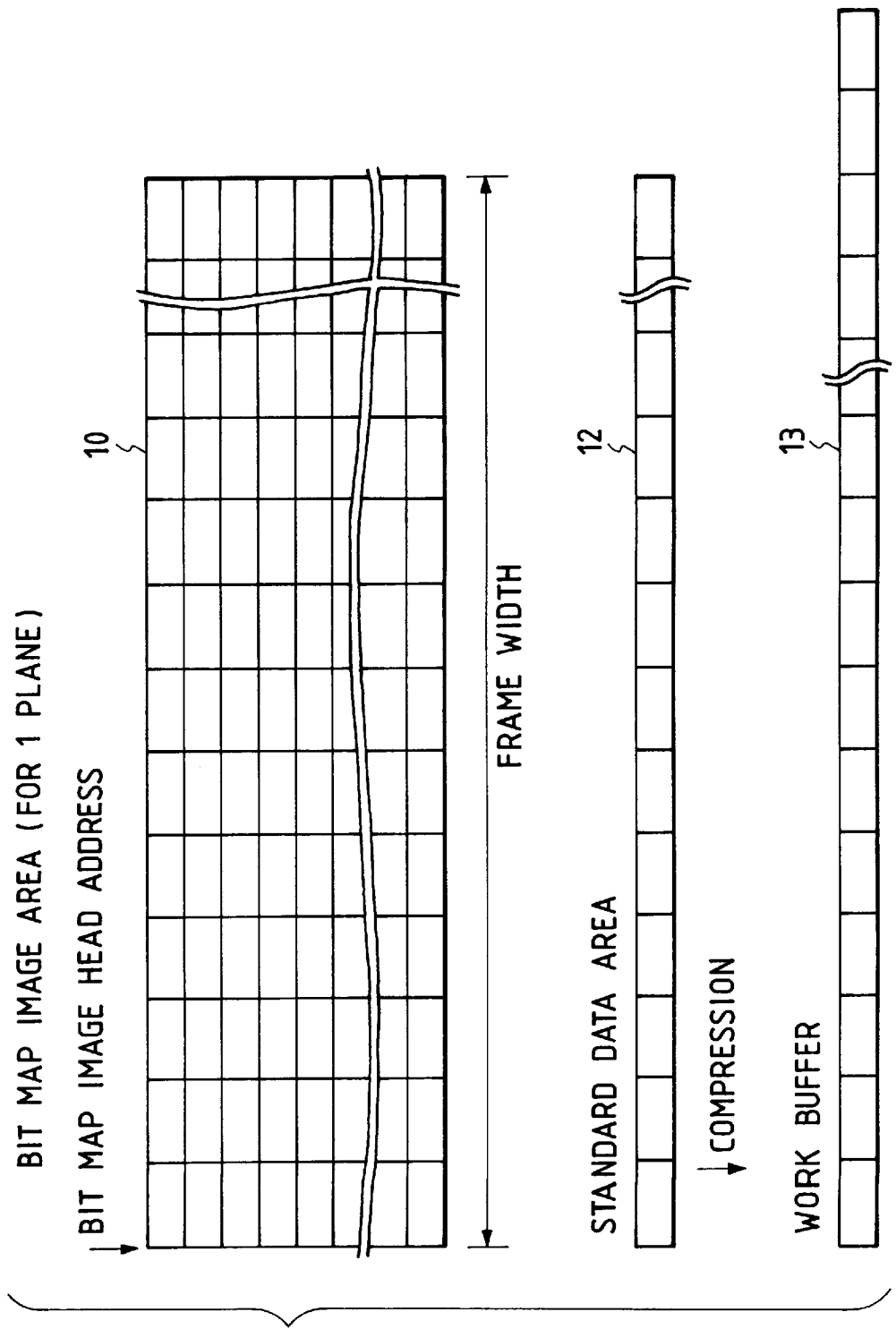
FIG. 9 is a view showing still another processing state of output data to be transferred to the print mechanism unit shown in FIG. 1.

FIG. 9 is a view showing the third output data processing state of data to be transferred to the print mechanism 8 shown in FIG. 1.

Referring to FIG. 9, a bit map image area 10 includes a line 12 which is not subjected to compression processing. A transmission work buffer 13 stores the result of the compression processing, and is assured on the RAM 5.

In this embodiment, upon transmission of data from the output section 6 to the print mechanism 8 in units of lines, means for detecting the status of the print mechanism 8 is arranged to efficiently utilize the waiting state of the actual transfer processing due to the full-of-data state of a reception buffer in the print mechanism 8 or the cleaning processing of a print head, so that line data which is to be subjected to standard transfer processing is compressed in correspondence with the current status of the print mechanism 8.

In this case, the standard transmission data 12 is compressed in the transmission work buffer when the print mechanism 8 cannot receive data, and the buffer address to be transferred is switched to the transmission work buffer 13. When the print mechanism 8 is ready to receive data, the compressed data is transferred.

The sixth embodiment will be described below with reference to FIG. 1.

According to the sixth embodiment, a printer which comprises a storage section (RAM 5) for storing bit image data (output data) generated by receiving input data from a data source (external apparatus 1) and analyzing the received input data, and the controller 7 for transferring the output data stored in the storage section to the print mechanism 8 comprising the printer engine via the predetermined interface I/F, comprises status communication means (realized by the control line CL in this embodiment) for communicating the status of the print mechanism 8, discrimination means (CPU 4) for discriminating if the status of the print mechanism 8 communicated by the status communication means represents a transfer possible state of transfer data, and a data compression section (realized as means for executing a compression program stored in the ROM 3 by the CPU 4) for, when the discrimination means determines that the status of the print mechanism 8 is not a transfer possible state of transfer data, compressing the output data, and writing the compressed data in the storage section. When the CPU 4 discriminates whether or not the status of the print mechanism 8 communicated via the control line CL is a transfer possible state of transfer data, and determines that the status of the print mechanism 8 is not a transfer possible state of transfer data, the CPU 4 compresses the output data and writes the compressed data in the RAM 5. The controller 7 transfers the compressed data or output data written in the RAM 5 as transfer data to the print mechanism 8 via the predetermined interface I/F. In this manner, when it is expected in accordance with the status of the print mechanism 8 that the start of data transfer is delayed, the already stored output data is compressed to reduce the data amount, thereby shortening the data transfer time after the start of the data transfer.

Figure 10:
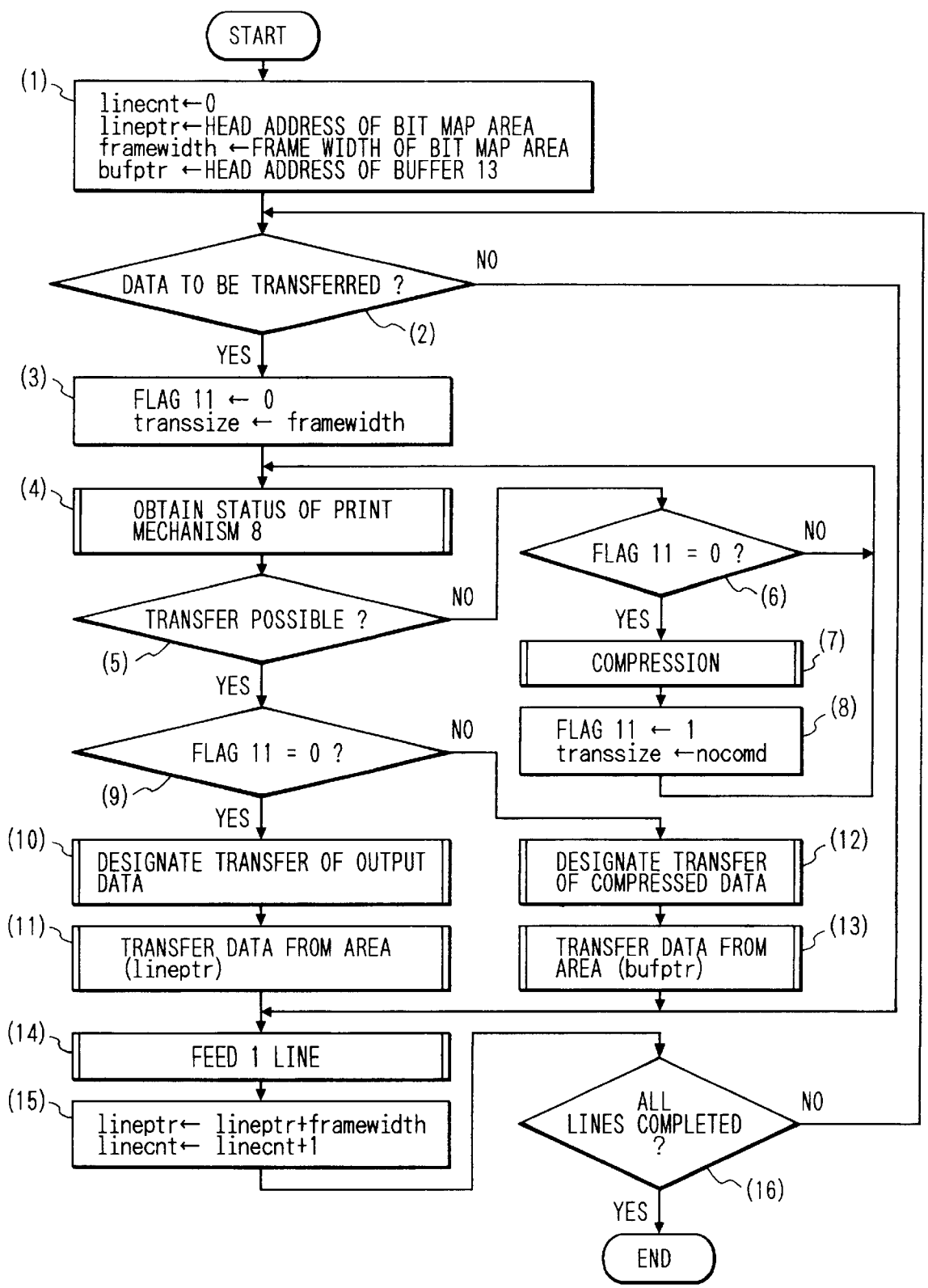
FIG. 10 is a flow chart showing still another data transfer control method of the printer according to the present invention.

FIG. 10 is a flow chart showing the third data transfer control method for the printer according to the present invention. Note that (1) to (16) indicate steps. The control program shown in this flow chart is stored in the ROM 3 and is executed by the CPU 4.

In step (1), "0" is set in the variable linecnt indicating the line number to be transferred, the head address of the bit map image area is set in the variable lineptr indicating the head address of the line to be transferred, the frame width is set in the variable framewidth indicating the width of the bit map image area, and the head address of the transmission work buffer 13 is set in the variable bufptr indicating the head address of the compression work buffer.

In step (2), it is checked by looking up a flag area (not shown) if transfer data to be printed is present in a raster to be currently transferred. This flag area is set by an instruction for drawing data in a corresponding line (attained by the control line CL in this embodiment), an actual drawing operation, or the like in page layout processing, drawing processing, or the like, and means that no data is present in a line for which this flag is not set.

If it is determined in step (2) that transfer data is present, a compression flag indicating whether or not compression processing is performed is set to be a value "0" indicating a non-compression state in step (3), and the contents of the variable framewidth are set in a variable transsize indicating the number of data to be transferred.

In step (4), the status of the print mechanism 8 is obtained by bidirectional information transmission means, the signal line, or the like between the output section 6 and the print mechanism 8. In step (5), it is checked if the print mechanism 8 is in a transfer possible state. If it is determined in step (5) that the print mechanism is not in a transfer possible state, the value of the compression flag is checked in step (6).

This is to prevent repetitive compression processing of data when the transfer impossible state continues for an extended period of time. If the compression flag is "0" indicating non-compression, data corresponding to the variable framewidth in the original line data area indicated by the variable lineptr are compressed and stored in the transmission work buffer 13 indicated by bufptr, and the number of compressed data, nocomd, is returned in step (7).

In step (8), "1"indicating the compressed state is set in the compression flag, and the number of compressed data, nocomd, as a return value obtained in step (7) is set in transsize indicating the transfer size. After this step and if it is determined in step (6) that data has already been compressed, the flow returns to step (4) and the control waits until a transfer possible state is set.

On the other hand, if it is determined in step (5) that the print mechanism is in a transfer possible state, the value of the compression flag is checked in step (9). If the flag is "0" indicating non-compression, transfer of output data is designated for the print mechanism 8 in step (10) so as to execute standard output data transfer processing.

In step (11), data corresponding to transsize as the transfer size are transferred as one-line data from the variable lineptr as the head address of the original data area.

On the other hand, if it is determined in step (9) that the compression flag is "1"indicating the compression state, since the transfer processing of compressed data is performed, transfer of compressed data is designated for the print mechanism 8 in step (12), and data corresponding to transsize as the transfer size are transferred as one-line data from bufptr as the head address of the compressed data storage area in step (13).

In either case, one-line feed processing of the print mechanism 8 is performed in step (14). In step (15), the target line is advanced by adding the variable framewidth to the variable lineptr, and the variable linecnt indicating the transfer target line number is also incremented by "1".

In step (16), it is checked based on linecnt if processing is completed for all the lines. If lines to be transferred still remain, the flow returns to step (2) to continue the processing; otherwise, the output processing ends. The ninth embodiment will be described below with reference to FIGS. 1 and 10, and the like.

According to the ninth embodiment, in a data transfer control method for a printer which comprises a storage section (RAM 5) for storing bit image data (output data) generated by receiving input data from a data source (external apparatus 1) and analyzing the received input data, the controller 7 for transferring the output data stored in the storage section to the print mechanism 8 comprising the printer engine via the predetermined interface I/F, and status communication means (realized by the control line CL in this embodiment) for communicating the status of the print mechanism 8, the discrimination step (steps (4) and (5) in FIG. 10) of discriminating if the status of the print mechanism 8 indicates a transfer possible state of transfer data, the data compression step (steps (6) to (8) in FIG. 10) of compressing the output data and writing the compressed data in the storage section when it is determined in the discrimination step that the status of the print mechanism 8 is not a transfer possible state of transfer data, and the transfer step (steps (9) to (11) or steps (9), (12), and (13) in FIG. 10) of transferring the compressed data or output data written in the storage section as transfer data to the print mechanism via the predetermined interface are executed. When it is expected based on the status of the print mechanism that the start of transfer of the stored output data is delayed, the data amount is reduced by compressing the already stored output data, thereby shortening the data transfer time after the start of data transfer.

The present invention may be applied to either a system constituted by a plurality of apparatuses, or an apparatus consisting of a single device. Also, the present invention may be applied to a case wherein the invention is achieved by supplying a program to the system or apparatus.

According to each of the embodiments described above, upon data transfer from the controller to the print mechanism in the printer, since the controller has a data compression processing function and the print mechanism has a data expansion processing function, the data transfer amount between the controller and the print mechanism can be reduced, thereby shortening the transfer time.

In addition, means for switching the standard transfer mode/compression transfer mode is arranged. When the data length after compression processing is expected to become larger than that of original data, switching control is made to invalidate the data compression processing result and to permit the standard transfer mode. In this manner, print control is executed while selecting data, which can shorten the transfer time, in units of lines. At this time, when the compressed data area and the original data area use a common area, the memory efficiency can also be improved.

Furthermore, when a plurality of bit map image areas are present, if there is another bit map image area on which data has already been drawn during transfer of data in a given area (in units of, e.g., pages or bands), the data drawn on the area is compressed in the transfer end waiting time, so that the next transfer processing can be performed at high speed.

When means for obtaining the status of the print mechanism is arranged between the controller and the print mechanism, a state wherein a reception buffer of the print mechanism is full of data or the start timing of reception is delayed due to print processing, cleaning processing or the like is detected by, e.g., independent interrupt processing at a predetermined timing using, e.g., the control line CL shown in FIG. 1. In such a case, the control is switched to compress data in the bit map image area under transfer and transfer the compressed data, thus allowing effective compression processing even in divisional drawing processing.

The 10th to 13th embodiments will be described below with reference to FIG. 1 and the like.

According to the 10th embodiment, a printer comprises the print mechanism 8 for printing bit map image data, generated by analyzing input data input from the external apparatus 1, onto a print medium, storage means (the RAM 5 or an NVRAM (not shown)) for storing a plurality of pieces of type information of a plurality of print media which can be used and processing conditions of the print mechanism 8 corresponding to the type information, first input means (a command designated by the external apparatus 1 or a key input instruction from an operation section (not shown)) for inputting the type information of a print medium to be used, and control means (realized by the function of the CPU 4) for setting the print processing condition for the print mechanism 8 by looking up the storage means on the basis of the type information input from the first input means. Since the CPU 4 sets the print processing condition for the print mechanism 8 by looking up the RAM 5 on the basis of type information input from the external apparatus 1 for inputting the type information of a print medium to be used, a print processing condition suitable for the designated print medium can be automatically set, and the load on an operator upon setting the print processing condition can be reduced.

In the 11th embodiment, the CPU 4 automatically sets a reversal processing condition for bit map image data as a print processing condition suitable for the designated print medium.

In the 12th embodiment, the CPU 4 automatically sets a type condition of a print method as a print processing condition suitable for the designated print medium.

In the 13th embodiment, when information of a required print method to be used is input from second input means for inputting information of a required print method to be used, the CPU 4 replaces a print method in the print processing condition, obtained from the storage means on the basis of the type information input from the first input means, by the required print method input from the second input means, so that the automatically set print method is desirably changed to a print method required by a user.

Figures 11, 14:
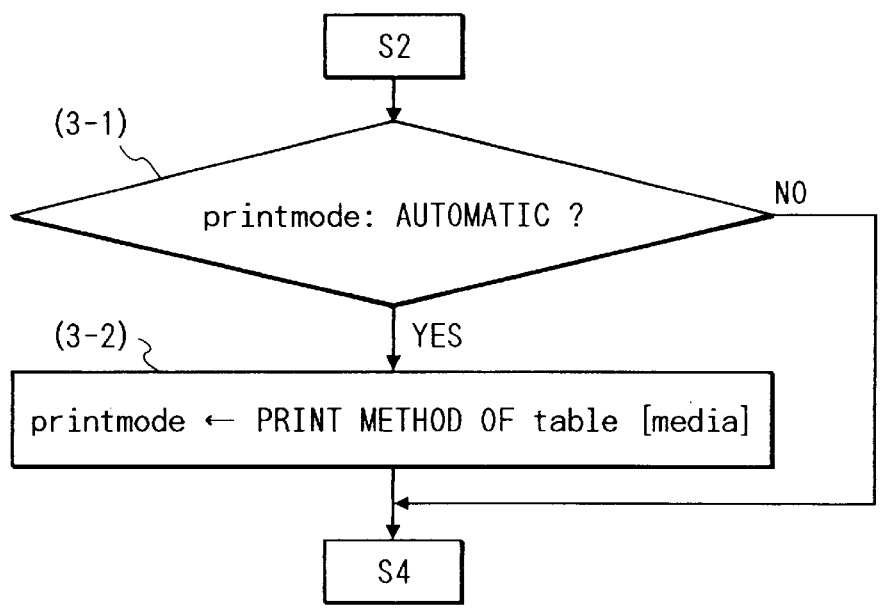
FIG. 11 is a view showing an example of a print processing condition table stored in a ROM shown in FIG. 1.
FIG. 14 is a flow chart showing principal part of another print processing condition setting method for the printer according to the present invention.

FIG. 11 shows an example of a table which is stored in the ROM 3 shown in FIG. 1 and stores print method information corresponding to print media.

As shown in FIG. 11, since combinations of two numerical values corresponding to print methods and conversion methods are stored in correspondence with supported print media (e.g., standard paper, coated paper, an OHP film, a back print film, an envelope, and the like), and indices [0] to [4] are assigned to these combinations, an optimal combination of a print method and a conversion method for a specific print medium can be read out.

In this embodiment, a user designates a print medium using input means for inputting the type of print medium such as a control command, a panel switch (not shown) for a user interface, or the like, and the input print medium information is stored in a storage area of the RAM 5. Upon execution of actual print processing, the print mode and the conversion processing method are obtained by looking up the print medium information as the index of the above-mentioned print method information table.

Figure 12A:
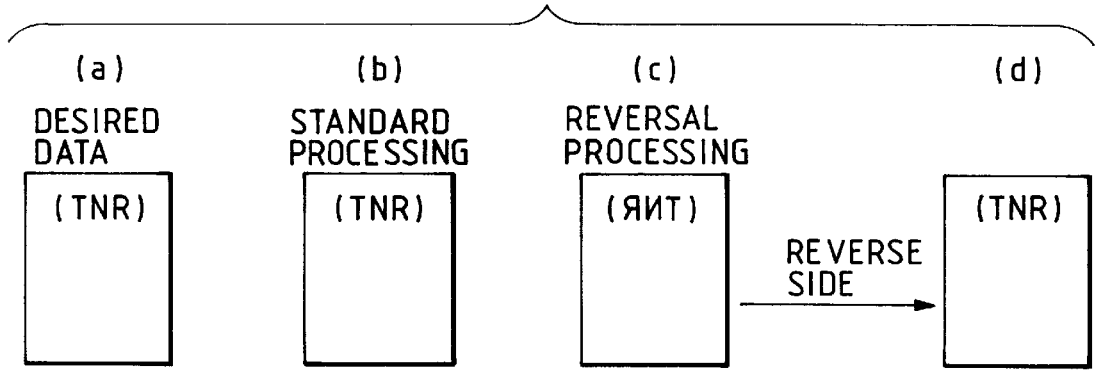
FIGS. 12A to 12C are views for explaining the reversal conversion processing state in the printer according to the present invention.
Figure 12B:
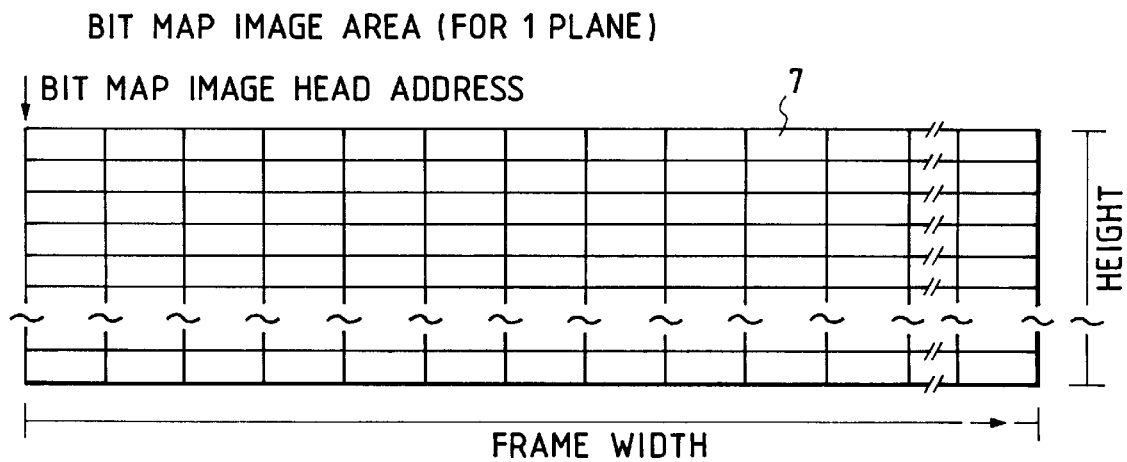
Figure 12C:
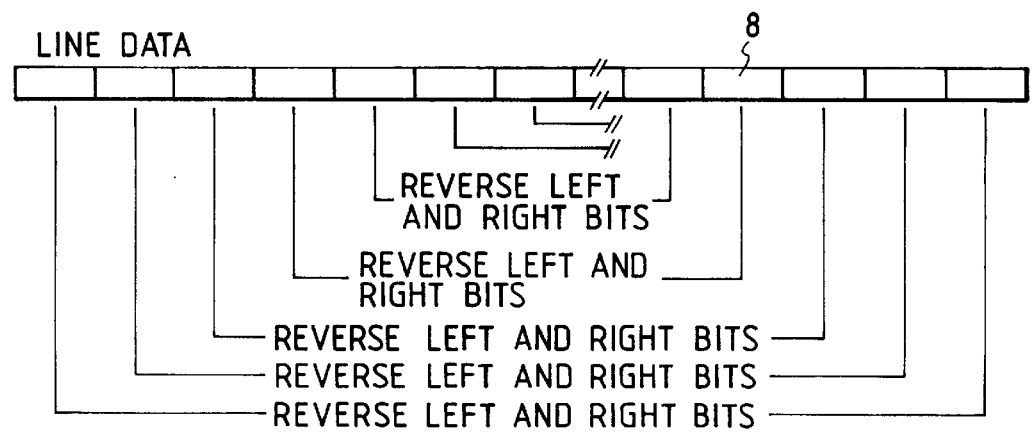

FIGS. 12A to 12C are schematic views for explaining the reversal conversion processing state in the printer according to the present invention.

In FIG. 12A, (a) shows the print result required by a user, (b) shows the standard processing result obtained when data is printed on a standard paper sheet, and (c) shows the print result of the reversal conversion processing. Such reversal print processing is performed on a semi-transparent film such as an OHP film, and the printed film is reversed when it is actually used, thus obtaining the print result (d) with a film-coated upper surface.

The conversion processing for this print method can be realized by simply reversing the entire bits (shown in FIG. 12B) from the leftmost end to the rightmost end in units of lines. That is, the conversion processing is realized by exchanging outer byte pair data for one line with each other while reversing the bits from the MSB to the LSB (FIG. 12C). Note that FIG. 12B shows a bit map image area 7.

Figures 13, 13A:
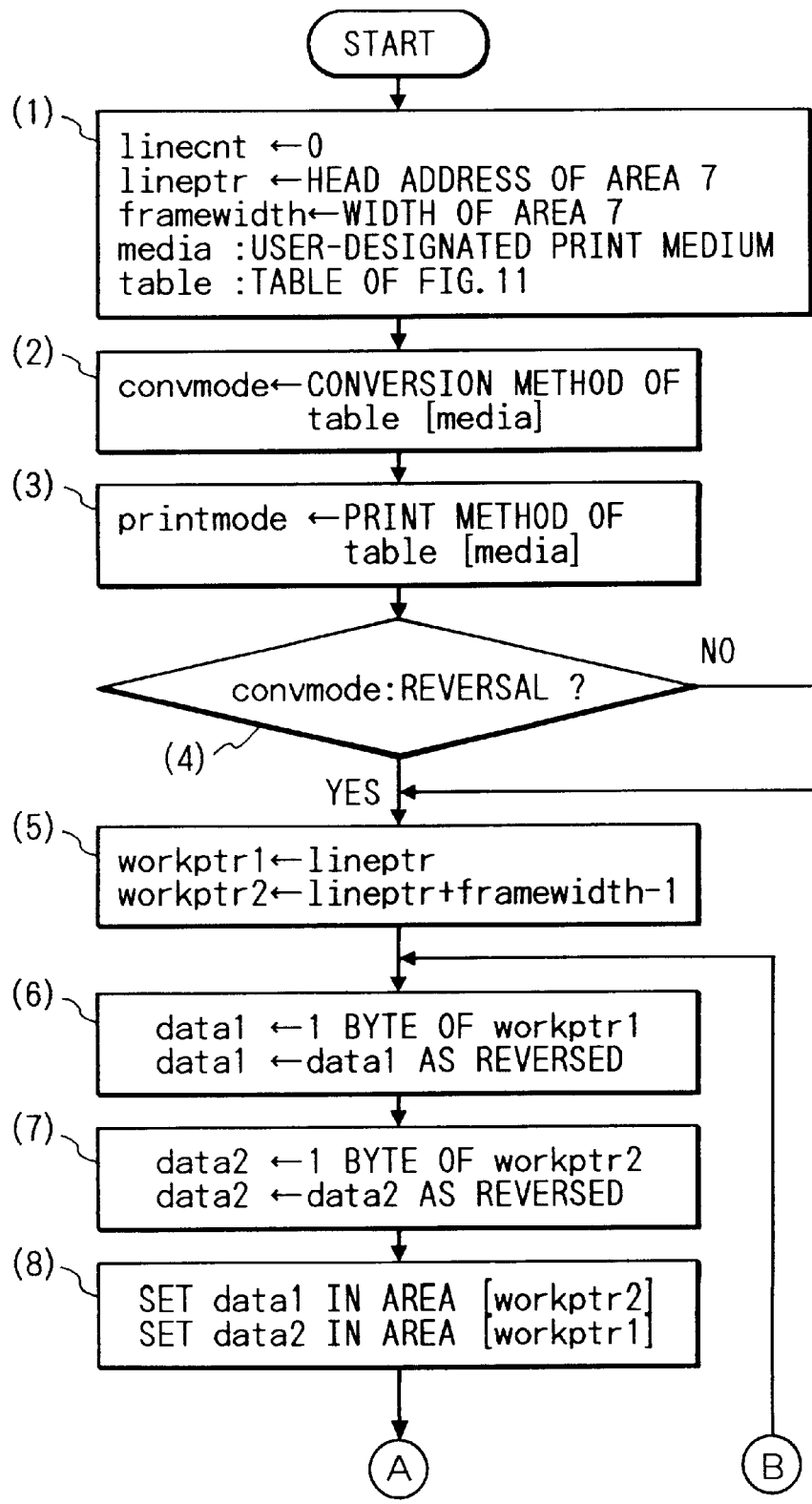
FIG. 13 is comprised of FIGS. 13A and 13B showing flow charts showing an embodiment of a print processing condition setting method for the printer according to the present invention.
Figure 13B:
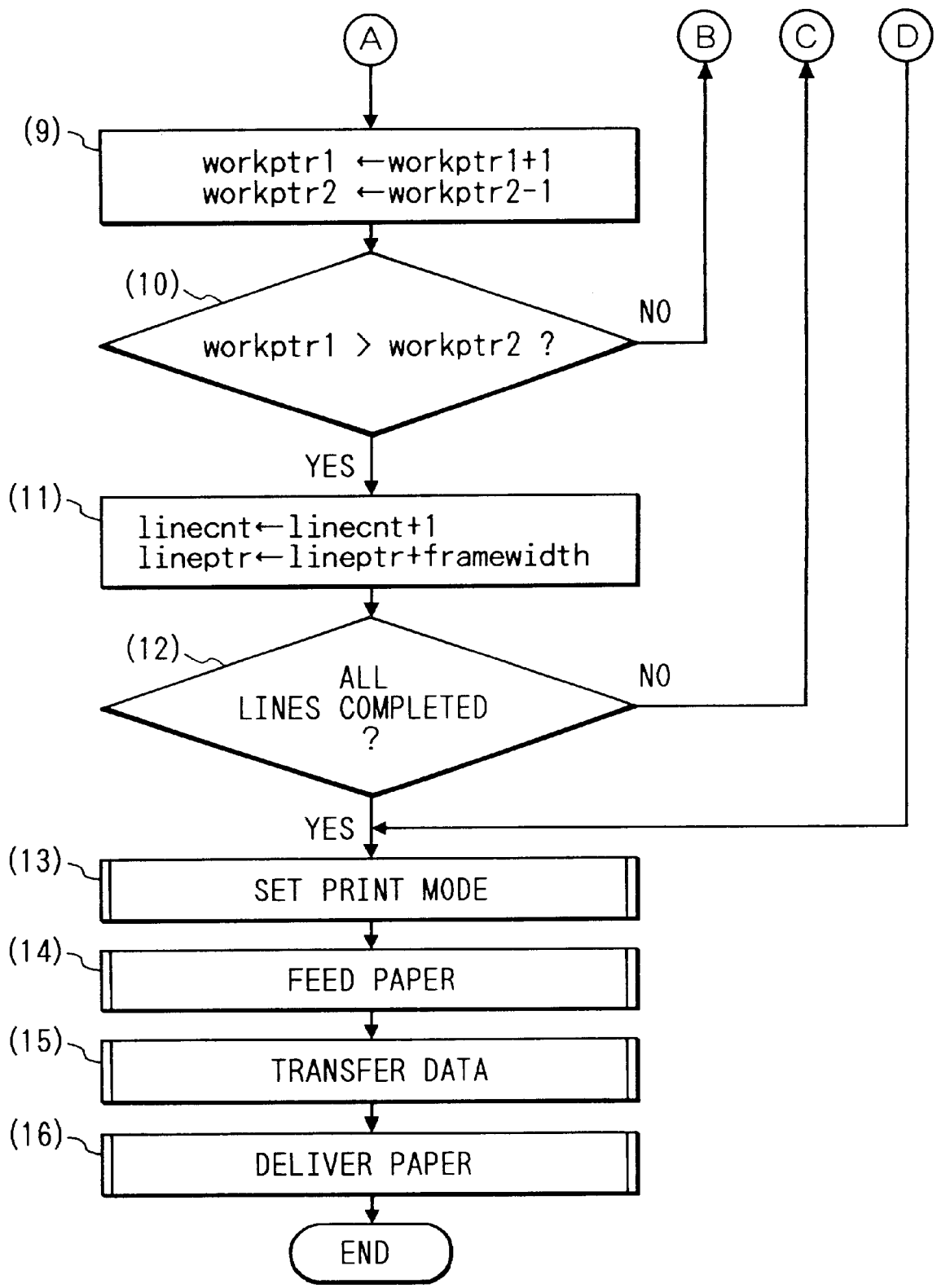

The print processing in the printer of the present invention will be described below with reference to the flow charts shown in FIGS. 13A and 13B. In FIGS. 13A and 13B, an explanation of the reversal processing or the like will be given for only one plane. However, since the same processing is merely repeated for all the required planes in the case of, e.g., color print processing, a description of processing for other planes will be omitted.

FIGS. 13A and 13B are flow charts showing an embodiment of the output processing condition setting method for the printer according to the present invention. Note that (1) to (16) indicate steps. The control program shown in this flow chart is stored in the ROM 3 and is executed by the CPU 4.

In step (1), "0" is set in the variable linecnt indicating the number of lines to be processed, the head address of the bit map image area 7 (see FIG. 12B) is set in the variable lineptr indicating the head address of the currently processed line, and the width of the bit map image area is set in framewidth indicating the number of data per line.

Note that a variable media holds print medium information designated by a user in this embodiment. A variable table indicates a table sequence which stores the print method information and the like shown in FIG. 11.

In step (2), a conversion processing method suitable for the print medium is obtained by looking up the table sequence using the variable media as an index value, and is set in a variable convmode. In step (3), print mode information suitable for the print medium is obtained by looking up the table sequence using the variable media as an index value, and is set in a variable printmode.

In step (4), it is checked by looking up the variable convmode if the currently designated print medium requires reversal conversion processing. If NO in step (4), the flow advances to step (13) and the subsequent steps; otherwise, the value of the variable lineptr is set in a left-side address variable workptr1 for accessing each byte data from the leftmost end of a line, and (lineptr+framewidth−1) is set in a right-side address variable workptr2 for accessing each byte data from the rightmost end of a line, in step (5).

In step (6), 1-byte data is read out from the address indicated by workptr1, is subjected to MSB<->LSB reversal processing, and the reversed data is stored in left-side data data1. Subsequently, in step (7), 1-byte data is read out from the address indicated by left-side address variable workptr2, is subjected to MSB<->LSB reversal processing, and the reversed data is stored in right-side data data2.

In step (8), data1 as the left-side data is set at the address indicated by workptr2 as the right-side data address, and data2 as the right-side data is set at the address indicated by workptr1 as left-side data address.

In step (9), the left-side address variable workptr1 is incremented by 1, and the right-side address variable workptr2 is decremented by 1, so as to define data inside the previous data by one byte as target data. In step (10), the left-side address variable workptr1 and the right-side address variable workptr2 are compared to check if the left-side address variable exceeds the right-side address, thereby discriminating if processing is completed for one line. If the left-side address variable does not exceed the right-side address, since data to be processed still remain, the flow returns to step (6) to execute data processing for the remaining data; otherwise, since the processing is completed for one line, the variable linecnt is incremented by 1 and framewidth is added to the variable lineptr in step (11) to update the address to indicate the next line.

In step (12), it is checked by looking up the variable lineptr if the processing is completed for all the lines. If non-converted lines still remain, the flow returns to step (5) to execute the conversion processing of the next line; if the conversion processing is completed for all the lines and if it is determined in step (4) that the reversal conversion processing is not designated, print mode setting processing is normally performed by looking up the previously set variable printmode in step (13).

Next, paper feed processing, transfer processing of data in the above-mentioned bit map data area, and paper delivery processing are executed in turn in steps (14), (15), and (16), thus ending the output processing.

In the above embodiment, a user does not intervene the print mode at all. Alteratively, input means for inputting a print mode by a user using a control command or by operating, e.g., a panel switch (not shown) for a user interface may be arranged, and the input print mode may be set in a storage area.

Upon designation of the print mode by a user, an "automatic" mode may be added as a new mode, and when the automatic mode is designated, a unique print mode may be selected as in the above embodiment; when the "automatic" mode is not designated, print processing according to the print mode designated by a user may be executed. In the output processing in this case, the processing in step (3) shown in FIG. 13A need only be replaced by the processing in steps (3-1) and (3-2) shown in FIG. 14. The 17th embodiment will be described below.

According to the 17th embodiment, in a print processing condition setting method for a printer which comprises the print mechanism 8 for printing bit map image data, generated by analyzing input data input from the external apparatus 1, onto a print medium, and storage means (the RAM 5 or an NVRAM (not shown)) for storing a plurality of pieces of type information of a plurality of print media which can be used and processing conditions of the print mechanism 8 corresponding to the type information, the input step (step (1) in FIG. 13A) and its pre-processing) of inputting type information of a print medium to be used, and the setting step (steps (2) and (3) in FIG. 13A) of setting the print processing condition for the print mechanism 8 by looking up the storage means on the basis of the input type information are executed, thereby automatically setting a print processing condition suitable for the designated print medium.

In the above embodiment, only the print method and the conversion processing method have been described as information inherent to a print medium. In addition, information corresponding to a print medium may be required in paper feed processing or print processing depending on the mechanical condition of the print mechanism 8.

Figure 15:
FIG. 15 is a view showing another example of the print processing condition table stored in the ROM shown in FIG. 1.

In such a case, as shown in FIG. 15, the thickness, print mode, and the like of a print medium may be stored in an extended version of the table of FIG. 11. In this manner, since optimal thickness information can be automatically set by designating a print medium, optimal paper feed processing or print processing can be executed.

According to the embodiment, since an optimal print mode is automatically set in correspondence with a paper sheet to be used by a user, a general user can obtain an optimal print result by only setting the type of medium to be used in a print operation.

Furthermore, since some print media require reversal print processing, this information is also stored in advance, so that the entire print processing can be optimized by designating only a print medium.

Figure 16:
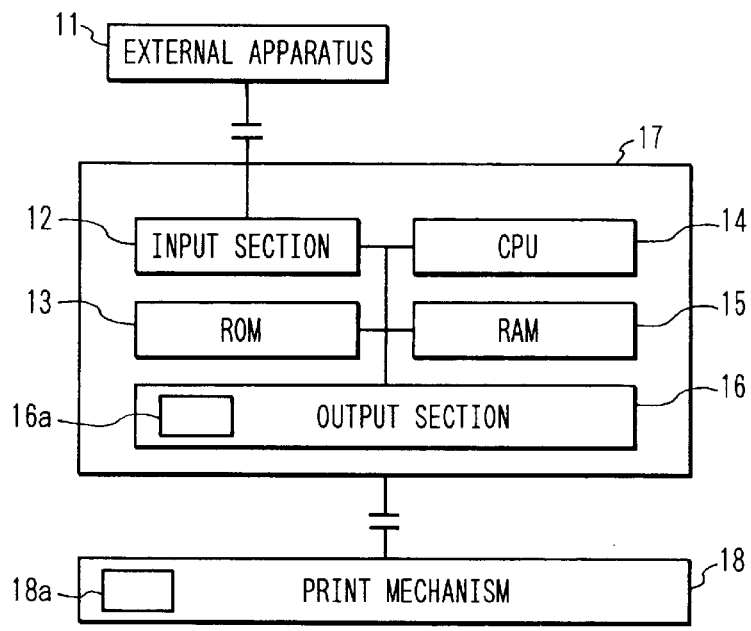
FIG. 16 is a block diagram for explaining the control arrangement of a printer according to the present invention.

FIG. 16 is a block diagram for explaining the control arrangement of a printer to which the present invention can be applied.

Referring to FIG. 16, an external apparatus 11 such as a host computer supplies input data to the printer, and executes an application software program and the like. An input section 12 receives the input data input to the printer. A ROM 13 stores control programs and various kinds of information. A CPU 14 executes the control programs stored in the ROM 13. The CPU 14 has a main function of performing page format processing by analyzing the input data and control commands received by the input section 12 in accordance with the control programs, and executing, e.g., actual development processing, and the like. Furthermore, the CPU 14 controls the entire printer. A RAM 15 stores output data generated by the CPU 14. The RAM 15 also stores work variables, buffers, and the like. An output section 16 transmits bit map image data developed on the RAM 15 to a print mechanism 18. A group of the input section 12, the ROM 13, the CPU 14, the RAM 15, and the output section 16 will be referred to as a controller 17 hereinafter. Note that the output section 16 comprises a data compression section 16a for compressing bit map image data to generate internal transfer data, and the print mechanism 18 comprises a data expansion section 18a for expanding the compressed internal transfer data to the bit map image data.

The print mechanism 18 performs a print operation on, e.g., a paper sheet. The print mechanism 18 is connected to the output section 16 via a predetermined interface, and executes paper feed processing, print processing, convey processing, and delivery processing in accordance with instructions by means of data transmission from the output section 16.

An example of the interface in this embodiment performs the print processing by transmitting output data from the output section 6 to the print mechanism 18 in units of lines, and generating a one-line convey feed instruction. The color print operation is performed by transmitting, for example, data of four designated colors (yellow, magenta, cyan, and black) via a single line, and thereafter, generating a one-line feed instruction.

The 14th to 16th embodiments will be described below.

According to the 14th embodiment, in a printer which comprises output means (output section 16) for outputting bit map image data generated by analyzing input data input from the external apparatus 11, and a print mechanism (print mechanism 18) for performing a print operation on a print medium on the basis of the bit map image data output from the output means, the output means (output section 16) comprises data compression means (data compression unit 16a) for generating compressed data by compressing the generated bit map image data, and the print mechanism comprises data expansion means (data expansion section 18a) for expanding the compressed data compressed by the data compression means to the bit map image data. The data compression section 16a in the output section 16 generates compressed data by compressing the generated bit map image data, and the compressed data transferred from the output section 16 is expanded to the bit map image data by the data expansion section 18a in the print mechanism 18, thereby shortening the data transfer processing time from the output section 16 to the print mechanism 18.

In the 15th embodiment, the data compression section 16a generates compressed data by compressing bit map image data in units of predetermined bands, thereby shortening the data transfer processing time from the output means to the print mechanism.

In the 16th embodiment, copy count designation means (realized by a command designated by the external apparatus 11 or a key instruction from an operation section (not shown)) for designating the number of copies is arranged. The data compression section 16a holds the generated compressed data in units of pages in a frame memory area on, e.g., the RAM 15 until the print operation corresponding to the number of copies designated by the copy count designation means is completed, thus reducing the number of times of transfer processing for the same bit map image data in copy print processing, and shortening the transfer time. In this case, the CPU 14 executes another processing.

Figure 17A:
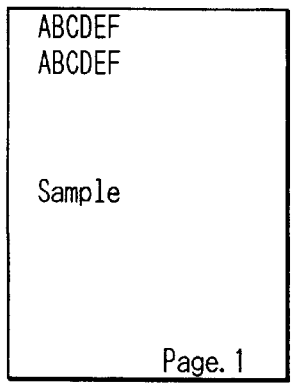
FIGS. 17A to 17C are views showing an example of bit map image data in the printer according to the present invention.
Figure 17B:
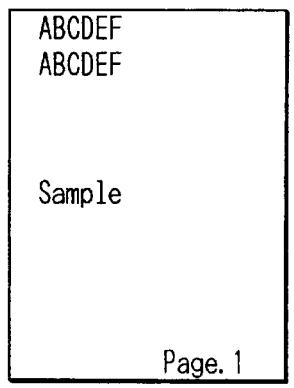
Figure 17C:
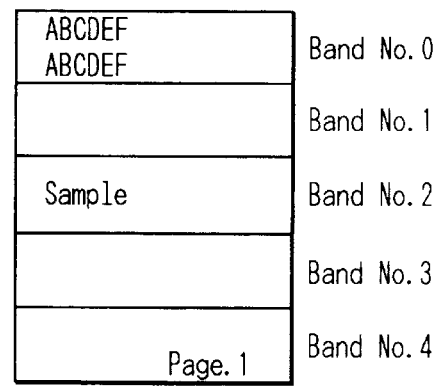

FIGS. 17A to 17C show an example of bit map image data in the printer according to the present invention.

As shown in FIGS. 17A to 17C, when an output shown in FIG. 17A is required on a paper sheet, if an area for all the data for one page is assured on the RAM 15 as a bit map image area, full bit map image data is directly drawn on this area, as shown in FIG. 17B.

On the other hand, when data for one page are to be divisionally drawn, for example, an area ⅕ the page height is assured on the RAM 15 as a bit map image area, as shown in FIG. 17C. In this case, shift drawing processing and transfer processing are executed five times to draw and output bit map image data for one page. At this time, one of divided areas will be referred to as a band hereinafter, and in this case, five bands constitute one page.

FIG. 18 is a view for explaining the relationship between the bit map image area and the transmission buffer assured on the RAM 15 shown in FIG. 16.

FIG. 18 corresponds to a state wherein compressed data subjected to data compression processing is stored in a transmission buffer 20 and thereafter the output section 16 transfers the data to the print mechanism 18 when data stored in a bit map image area 19 assured on the RAM 15 are to be transferred.

Figure 19:
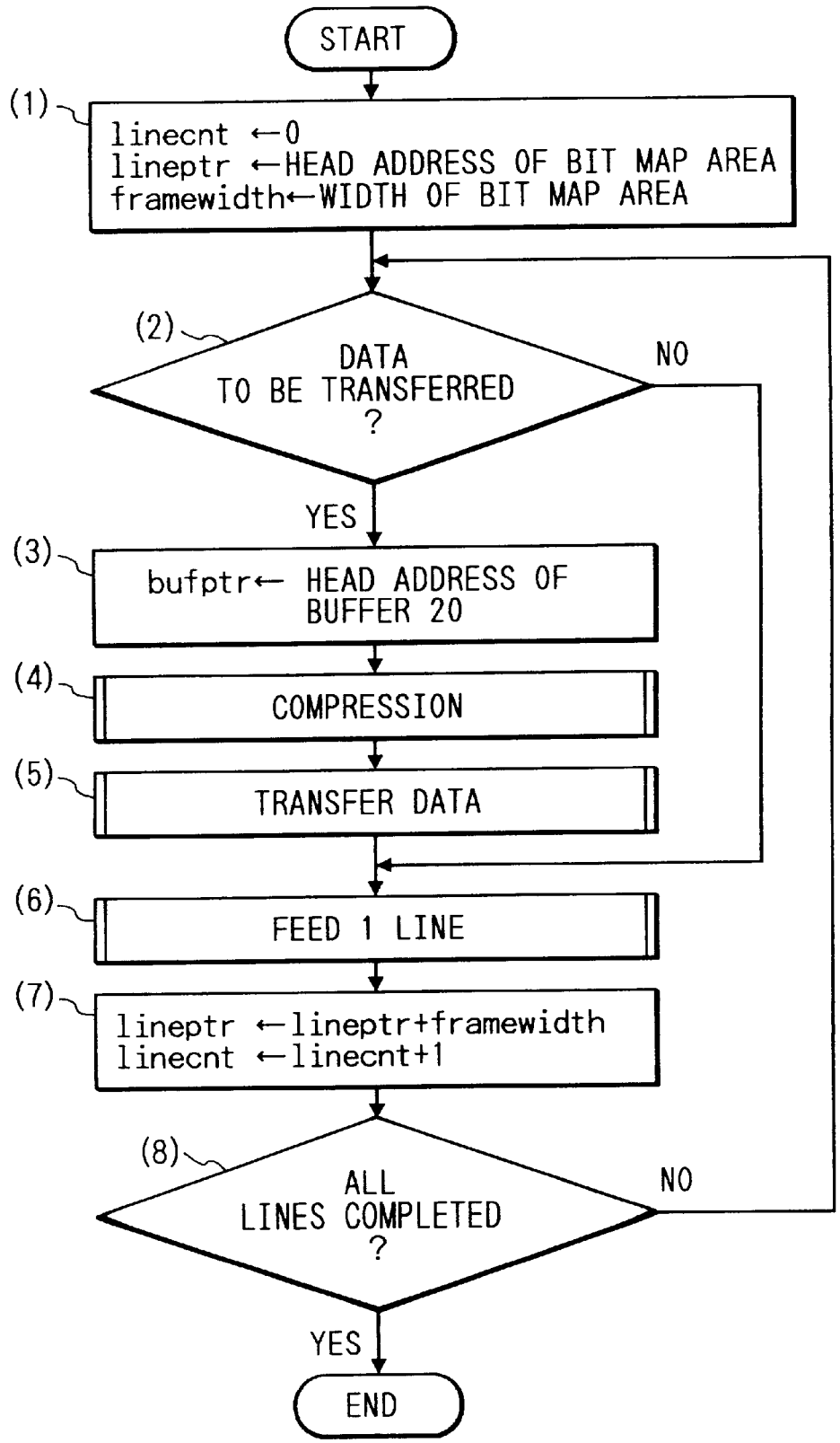
FIG. 19 is a flow chart showing the data transfer method of the printer according to the present invention.

FIG. 19 is a flow chart showing an embodiment of a data transfer method for the printer according to the present invention. Note that (1) to (8) indicate steps. This flow chart includes a case wherein full bit map data shown in FIG. 17B is output, and a case wherein data in one band shown in FIG. 17C is output. The control program shown in the flow chart is stored in the ROM 13, and is executed by the CPU 14.

A description will be started from a state wherein the drawing processing of bit map image data has been finished, and data is to be transferred from the output section 16 to the print mechanism 18.

In this embodiment, when multiple planes are used, the same processing is repeated in correspondence with the number of planes. For this reason, in this embodiment, processing for one plane will be described. In addition, a description of paper feed and delivery control operations for the print mechanism 18 is omitted.

In data transfer, initialization is performed in step (1). More specifically, "0" is set in a variable linecnt indicating the number of transferred lines, the head address of the bit map image area 10 serving as a transfer source is set in a variable lineptr, and the width of the bit map image area 10 is set in a variable framewidth.

In step (2), it is checked by looking up a flag area (not shown) if data to be transferred is present in a raster to be currently transferred. This flag area is set by an instruction for drawing data in a corresponding line, an actual drawing operation, or the like in page layout processing, drawing processing, or the like, and means that no data is present in a line for which this flag is not set.

If no data to be transferred is present in step (2), the flow advances to step (6) and subsequent steps; otherwise, the head address of the transmission buffer 20 shown in FIG. 18 is set in a variable bufptr indicating the head address of a compressed data storage area in step (3).

In step (4), a compression processing routine is executed using the original data head address lineptr, the compressed data storage address bufptr, and the original data length framewidth as arguments, and compressed data are stored in turn from the compressed data storage address bufptr. After all the data are compressed and stored, the number of compressed data, nocomd, is returned as a return value.

In step (5), a transfer processing routine is executed to transfer data for one line. In this case, the data transfer processing is executed in accordance with a protocol which is determined in advance for the print mechanism, using, as arguments, the compressed data storage address bufptr as the transfer data head address and the number of transfer data obtained as a return value in step (4).

In step (6), paper feed processing for one line is performed. In step (7), the width of the bit map image area is added to the original data head address lineptr to update the address to indicate the next line, and the transfer line counter linecnt is incremented by "1".

In step (8), it is checked based on linecnt if the transfer processing is completed for all the lines. If the transfer processing is not completed, the flow returns to step (2) to execute processing for the next line; otherwise, the transfer processing ends.

In this embodiment, only compressed data is transferred in data transfer between the output section 16 and the print mechanism 18.

In this embodiment, compression processing before transfer to be executed when the map image of full bit map image data shown in FIG. 17B is to be transferred and the copy count is set to be 2 or more by the copy count setting means such as a control command will be described below.

FIG. 20 is a schematic view showing the transfer data processing state in the printer to which the present invention can be applied.

Compressed data is generated in a compression processing work buffer 21 using, as original data, each line data in a full bit map area 22 for which drawing processing has been completed, the number of compressed data is stored in a compressed data count storage sequence 23 corresponding to the respective lines, and thereafter, the contents of the compression processing work buffer 21 are copied to an original area. In this manner, all the data in the full bit map area are compressed in units of lines. The compressed data are transferred in correspondence with the number of pages and are subjected to the print processing.

Figure 21B:
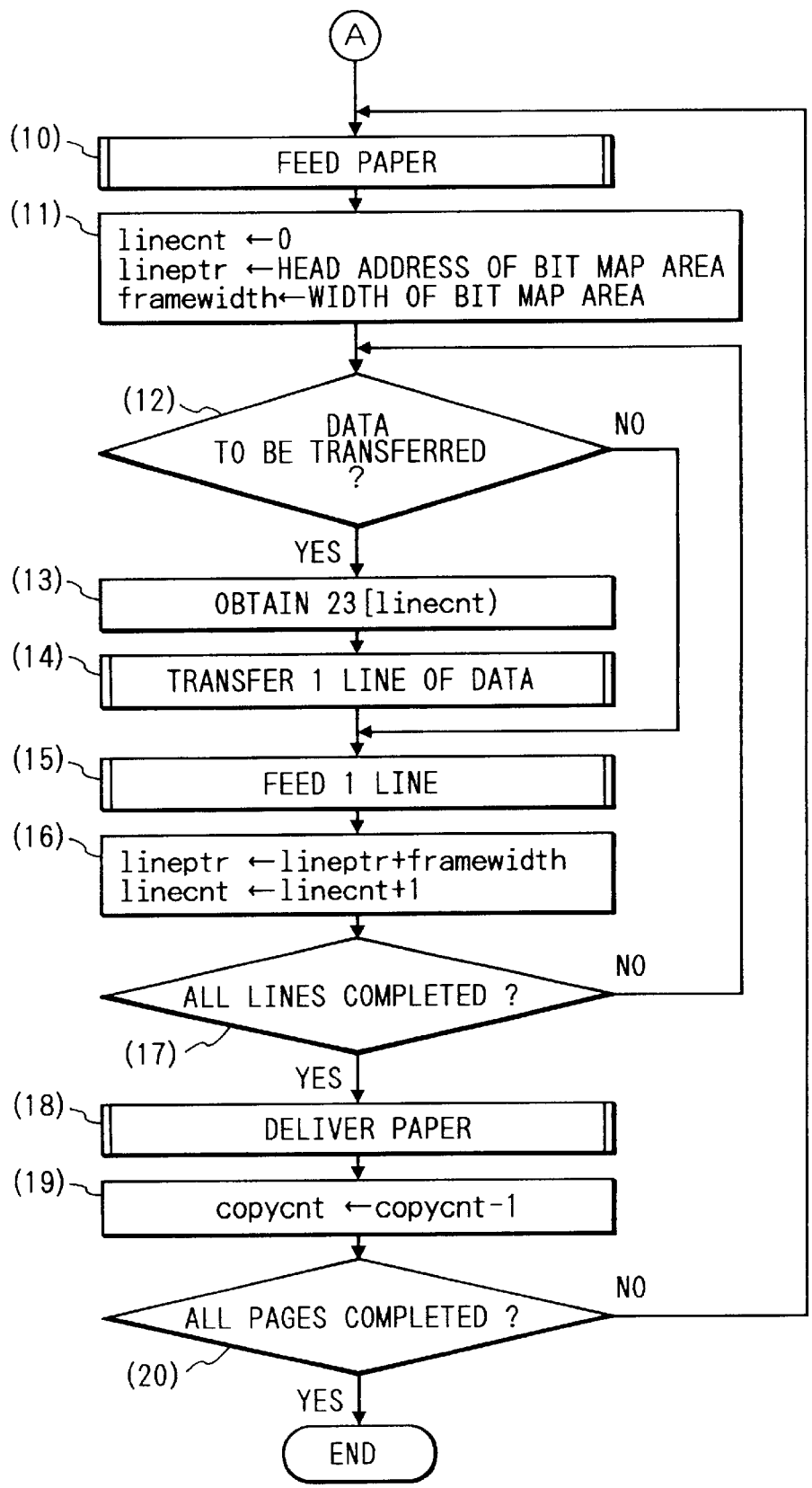
FIG. 21 is comprised of FIGS. 21A and 21B showing flow charts showing the data compression transfer method in the printer according to the present invention.

FIGS. 21A and 21B are flow charts showing an embodiment of the data compression transfer method for the printer according to the present invention. Note that (1) to (20) indicate steps. The control program shown in this flow chart is stored in the ROM 13 and is executed by the CPU 14.

In this embodiment, the data compression transfer processing is executed after a copy count is designated to be 2 or more by the copy count setting means such as a control command and all the drawing data are drawn on the full bit map area.

In step (1), initialization is performed. More specifically, "0" is set in the variable linecnt indicating the number of compressed lines, the head address of the bit map image area serving as a transfer source is set in the variable lineptr, and the width of the bit map image area is set in the variable framewidth.

In step (2), it is checked by looking up a flag area (not shown) if data to be transferred is present in a raster to be currently transferred. If no data to be transferred is present in step (2), the flow advances to step (7) and subsequent steps; otherwise, the head address of the transmission buffer 20 shown in FIG. 20 is set in the variable bufptr indicating the head address of a compressed data storage area in step (3).

In step (4), data compression processing is performed using the original data head address lineptr, the compressed data storage address bufptr, and the original data length framewidth as arguments, and the compressed data are stored in turn from the compressed data storage address. After all the data are compressed and stored, the compressed data length, nocomd, is returned as a return value. In step (5), the number of compressed data (compressed data length) returned as a result of the compression processing is stored in the (linecnt)-th area of the compressed data count storage sequence 23. In step (6), copy processing of the compressed data is executed on the basis of the head address bufptr of the compression processing work buffer 21, the storage address lineptr, and the value at the (linecnt)-th area in the compressed data count storage sequence 23 indicating the number of bytes to be transferred.

In this manner, original data for one line are compressed.

In step (7), the bit map image width (framewidth) is added to the original data head address lineptr so as to update the address to indicate the next line, and the transfer line counter linecnt is incremented by 1. In step (8), it is checked based on linecnt if the transfer processing is completed for all the lines. If the transfer processing is not completed, the flow returns to step (2) to execute compression processing of the next line; otherwise, the compression processing ends, i.e., the compression processing of full bit map data ends.

Subsequently, page print processing for the designated number of copies is started. In step (9), the designated number of copies is set in a variable copycnt. In step (10), paper feed processing is performed. This processing is achieved by transmitting a predetermined data string from the output section 16 to the print mechanism 18.

After the paper feed processing, initialization is performed in step (11). That is, "0" is set in the variable linecnt indicating the number of transferred lines, the head address of the bit map image area serving as the transfer source is set in the variable lineptr, and the width of the bit map image area is set in the variable framewidth. In step (12), it is checked by looking up a flag area (not shown) if data to be transferred is present in a raster to be currently transferred. If no data to be transferred is present in step (12), the flow advances to step (15) and subsequent steps; otherwise, the number of compressed data is read out from the (linecnt)-th area in the compressed data count storage sequence 23 in step (13), and data transfer processing for one line is executed in step (14).

At this time, the data transfer processing is executed in accordance with a protocol which is determined in advance for the print mechanism, using, as arguments, lineptr as the transfer data head address and the number of compressed data obtained in step (13).

In step (15), paper feed processing for one line is executed. In step (16), the bit map image width (framewidth)

is added to the original data head address lineptr so as to update the address to indicate the next line, and the transfer line counter linecnt is incremented by "1".

In step (17), it is checked based on the variable linecnt if the processing is completed for all the lines. If the transfer processing is not completed, the flow returns to step (12) to execute processing for the next line; otherwise, since the transfer processing for one page has been completed, the paper delivery processing is executed in step (18). In step (19), the variable copycnt is decremented by "1". In step (20), whether or not all the pages are output is checked by discriminating if the variable copycnt is larger than "0". If the variable copycnt is larger than "0" (NO), since a page to be copied still remains, the flow returns to step (10) to execute the paper feed, print, and delivery processing operations of the next page; otherwise, since all the pages have been printed, the output processing ends.

According to the above embodiment, upon data transfer from the controller to the print mechanism in the printer, since the controller has a data compression processing function and the print mechanism has a data expansion processing function, the data transfer amount between the controller and the print mechanism can be reduced, thereby shortening the transfer time.

In addition, when the same data must be repetitively transferred to the print mechanism by, e.g., a copy function, the compression processing is performed only once not in a transfer operation but for print data itself, and thereafter, the compressed print data is transferred to the print mechanism, thereby reducing processing cost and time cost, and improving the performance of the entire printer.

What is claimed is:

1. An apparatus for outputting image data to a printer, said apparatus comprising:

generating means generating the image data;

determining means determining whether or not a band or a page of the image data generated by said generating means is to be compressed, on the basis of an amount of the generated image data to be transferred to the printer;

compression means compressing the image data generated by said generating means into compressed data by a band unit or a page unit, in accordance with a determination from said determining means;

storage control means controlling, if said determining means determines that the band or page of the generated image data is to be compressed, a memory to store the band or page of the generated image data compressed by said compression means, and, if said determining means determines that the band or page of the generated image data is not to be compressed, controlling the memory to store the band or page of the generated image data without compression; and transfer means transferring the stored data from the memory to the printer.

2. An apparatus according to claim 1, wherein said storage control means controls the memory to sequentially store one of the compressed data and the image data in a common transfer data area in the memory.

3. An apparatus according to claim 1, wherein data input to said generating means is described in a page description language.

4. An apparatus according to claim 1, wherein the image data is bit map image data.

5. An apparatus according to claim 1, further comprising the printer to which the image data is output.

6. An apparatus according to claim 1, wherein said compression means compresses the image data generated by the page unit.

7. An apparatus according to claim 1, wherein the memory comprises a memory area for storing a plurality of bands or pages of the generated image data.

8. An apparatus according to claim 1, wherein a data transfer by said transfer means and a data compression by said compression means are performed in parallel.

9. An apparatus according to claim 1, wherein said determining means determines that the band or page of the generated image data is to be compressed, if the generated image data to be transferred to the printer exceeds a predetermined amount.

10. An apparatus according to claim 1, wherein said transfer means transfers the data stored in the memory and data indicating whether the stored data is compressed data to the printer.

11. A data transfer method for use in an apparatus for outputting image data to a printer, said method comprising the steps of:

generating the image data;

determining whether or not a band or a page of the image data generated in said generating step is to be compressed on the basis of an amount of the generated image data to be transferred to the printer;

compressing the image data generated in said generating step into compressed data by a band unit or a page unit, in accordance with a determination made in said determining step;

controlling a memory to store the band or page of the generated image data compressed in said compressing step, if it is determined in said determining step that the band or page of the generated image data is to be compressed, and, controlling the memory to store the band or page of the generated image data without compression, if it is determined in said determining step that the band or page of the generated image data is not to be compressed; and transferring the stored data from the memory to the printer.

12. A method according to claim 11, further comprising the step of sequentially storing one of the compressed data and the image data in a common transfer data area in the memory.

13. A method according to claim 11, wherein data used in said generating step is described in a page description language.

14. A method according to claim 11, wherein the image data is bit map image data.

15. A method according to claim 11, further comprising the step of printing the stored data.

16. A method according to claim 11, wherein the image data generated by the page unit is compressed in said compressing step.

17. A method according to claim 11, further comprising the step of storing a plurality of bands or pages of the generated image data in a memory area of the memory.

18. A method according to claim 11, wherein a data transfer in said transferring step and a data compression in said compressing step are performed in parallel.

19. A method according to claim 11, wherein it is determined in said determining step that the band or page of the generated image data is to be compressed, if the generated image data to be transferred to the printer exceeds a predetermined amount.

20. A method according to claim 11, wherein in said transferring step, the data stored in the memory and data indicating whether the stored data is compressed data is transferred to the printer.

21. A system for outputting and printing image data comprising:

a printer for printing the image data;

generating means generating the image data;

determining means determining whether or not a band or a page of the image data generated by said generating means is to be compressed, on the basis of an amount of the generated image data to be transferred to said printer;

compression means compressing the image data generated by said generating means into compressed data by a band unit or a page unit, in accordance with a determination from said determining means;

storage control means controlling, if said determining means determines that the band or page of the generated image data is to be compressed, a memory to store the band or page of the generated image data compressed by said compression means, and, if said determining means determines that the band or page of the generated image data is not to be compressed, controlling the memory to store the band or page of the generated image data without compression; and transfer means transferring the stored data from the memory to said printer.

22. A system according to claim 21, wherein said storage control means controls the memory to sequentially store one of the compressed data and the image data in a common transfer data area in the memory.

23. A system according to claim 21, wherein data input to said generating means is described in a page description language.

24. A system according to claim 21, wherein the image data is bit map image data.

25. A system according to claim 21, wherein said compression means compresses the image data generated by the page unit.

26. A system according to claim 21, wherein the memory comprises a memory area for storing a plurality of bands or pages of the generated image data.

27. A system according to claim 21, wherein a data transfer by said transfer means and a data compression by said compression means are performed in parallel.

28. A system according to claim 21, wherein said determining means determines that the band or page of the generated image data is to be compressed, if the generated image data to be transferred to said printer exceeds a predetermined amount.

29. A system according to claim 21, wherein said transfer means transfers the data stored in the memory and data indicating whether the stored data is compressed data to said printer.

30. A system according to claim 21, wherein said printer is an ink jet printer.

* * * * *

UNITED STATES PATENT AND TRADEMARK OFFICE
CERTIFICATE OF CORRECTION

PATENT NO.    : 6,009,242
DATED         : December 28, 1999
INVENTOR(S)   : Katsuhiko Anzai It is certified that error appears in the above-identified patent and that said Letters Patent is hereby corrected as shown below:

Column 13,
Line 2, "`date;" should read -- date; --.

Column 19,
Line 49, "data 1." should read -- data1. --.

Signed and Sealed this

Thirty-first Day of December, 2002

JAMES E. ROGAN
*Director of the United States Patent and Trademark Office*